United States Patent
Edge

(10) Patent No.: US 12,120,578 B2
(45) Date of Patent: Oct. 15, 2024

(54) SYSTEMS AND METHODS FOR CIVIC LOCATION DETERMINATION FOR MOBILE DEVICES

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 17/111,794

(22) Filed: Dec. 4, 2020

(65) Prior Publication Data
US 2022/0182785 A1 Jun. 9, 2022

(51) Int. Cl.
*H04W 4/029* (2018.01)
*G01S 19/01* (2010.01)

(52) U.S. Cl.
CPC ............ *H04W 4/029* (2018.02); *G01S 19/01* (2013.01)

(58) Field of Classification Search
CPC ..... H04W 64/00; H04W 4/029; H04W 84/12; H04W 16/18; H04W 4/025; H04W 88/08; H04W 4/027; H04W 4/02; H04W 64/003; H04W 4/33; H04W 64/006; H04W 36/32; H04W 12/63; H04W 12/79; H04W 16/20; H04W 40/244; G01S 5/0252; G01S 5/14; G01S 5/02521; G01S 5/02526; G01S 9/01; G01S 19/01; G01S 2205/006; G01S 5/0269; G01S 5/0278
See application file for complete search history.

(56) References Cited

U.S. PATENT DOCUMENTS

| 2016/0044504 | A1* | 2/2016 | Edge | H04W 4/02 |
| | | | | 455/456.3 |
| 2020/0229206 | A1* | 7/2020 | Badic | H04W 16/32 |

FOREIGN PATENT DOCUMENTS

WO    WO-2016032674 A1 *  3/2016   ........... G01S 5/0252

OTHER PUBLICATIONS

International Search Report and Written Opinion—PCT/US2021/072134—ISA/EPO—Feb. 8, 2022.

* cited by examiner

*Primary Examiner* — Nizar N Sivji
*Assistant Examiner* — Jing Gao
(74) *Attorney, Agent, or Firm* — Thien T. Nguyen

(57) ABSTRACT

Embodiments described herein provide means by which a civic location of a target mobile device may be determined using crowdsourced information from other mobile devices. The information can include information regarding Access Points (APs) and/or other access nodes obtained by the other mobile devices, as well as respective locations of the other mobile devices. A server, for example, can use this information to determine a coverage heatmap for each AP. Coverage heatmaps can be used, along with civic location information, to determine a civic location of a target mobile device based on the target mobile device's detection and possible measurements of wireless signals from one or more of the APs.

31 Claims, 13 Drawing Sheets

SYSTEMS AND METHODS FOR CIVIC LOCATION DETERMINATION FOR MOBILE DEVICES

BACKGROUND

1. Field of Invention

The present invention relates generally to the field of wireless communications, and more specifically to determining the location of a mobile device in a wireless network.

2. Description of Related Art

Obtaining the location of a mobile device, or user equipment (UE), that is accessing a wireless network may be useful or necessary for many applications including, for example, emergency calls, personal navigation, asset tracking, locating a friend or family member, etc. It may often be the case that a civic address of the mobile device may be more helpful than geodetic coordinates (e.g. X, Y, and Z coordinates). This is particularly the case for emergency services, in which a user may place an emergency call (e.g., an E911 call in the United States) using a mobile device within a wireless network, which is routed to a Public Safety Answering Point (PSAP) whose service area includes the current location of the user. A PSAP operator may then need an accurate and meaningful location of the user in order to dispatch public safety responders to the user as speedily as possible.

For emergency services, attempts have been made to standardize and deploy a solution to locate mobile devices based on previously known locations of Wireless Local Area Network (WLAN) or WiFi Access Points (APs) visible to a user's mobile device. This solution uses previously configured civic locations of WiFi APs stored in a National Emergency Address Database (NEAD). However, this solution has been abandoned because of an insufficient number of APs populated in the NEAD. Without a means for providing a reliable civic location to a PSAP by other means, PSAPs will continue to receive geodetic locations for mobile devices for emergency calls which may not enable faster public safety response times.

BRIEF SUMMARY

Embodiments described herein provide means by which a civic location of a target mobile device may be determined using information crowdsourced from other mobile devices. The information can include information regarding Access Points (APs) (e.g., Wireless Local Area Network (WLAN) or WiFi APs) from the other mobile devices, as well as respective locations of the other mobile devices. A server, for example, can use this information to determine a coverage heatmap for each AP. Coverage heatmaps can be used, along with civic location information, to determine a location of a target mobile device based on the target mobile device's detection and possible measurements of wireless signals from one or more of the APs.

An example of determining a civic location of a mobile device performed by a location server, according to this description, comprises receiving information regarding one or more APs from the mobile device, the information including an identity of each AP of the one or more APs, determining a location of the mobile device based on the information and a coverage heatmap for each AP of the one or more APs, wherein the coverage heatmap for each AP of the one or more APs indicates: a geographic area or geographic volume within which wireless signals from the respective AP can be received, and a density of mobile device locations within the geographic area or geographic volume at which additional mobile devices received wireless signals from the respective AP. The method further comprises determining the civic location of the mobile device based on the location.

An example method of determining a coverage heatmap for each of one or more APs, according to this description, comprises receiving information regarding the one or more APs from each mobile device of a plurality of mobile devices, the information including, for each mobile device of the plurality of mobile devices an indication of one or more locations from a plurality of locations, and for each location of the one or more locations, an identity of at least one AP of the one or more APs whose wireless signals were received by each mobile device at each location. The method further comprises, for each AP of the one or more APs, determining the coverage heatmap for the respective AP from the information, wherein the coverage heatmap comprises a geographic area or geographic volume and a density of locations of the plurality of locations within the geographic area or geographic volume at which wireless signals from the respective AP were received by the plurality of mobile devices.

An example method of obtaining a civic location of a mobile device, according to this description, comprises detecting wireless signals from one or more APs, obtaining information regarding the one or more APs, the information including an identity of each AP of the one or more APs, sending the information to a location server. The method further comprises responsive to sending the information to the location sever, receiving the civic location of the mobile device from the location server, wherein the civic location is determined based on the information sent to the location server, and a coverage heatmap of at least one AP of the one or more APs.

An example server for determining a civic location of a mobile device, according to this description, comprises a communication interface, a memory, and one or more processors communicatively coupled with the memory and the communication interface. The one or more processors are configured to receive, via the communication interface, information regarding one or more APs from the mobile device, the information including an identity of each AP of the one or more APs. The one or more processors are also configured to determine a location of the mobile device based on the information and a coverage heatmap for each AP of the one or more APs, wherein the coverage heatmap for each AP of the one or more APs indicates a geographic area or geographic volume within which wireless signals from the respective AP can be received, and a density of mobile device locations within the geographic area or geographic volume at which additional mobile devices received wireless signals from the respective AP. The one or more processors are further configured to determine the civic location of the mobile device based on the location.

An example server for determining a coverage heatmap for each of one or more APs, according to this description, comprises a communication interface, a memory, and one or more processors communicatively coupled with the memory and the communication interface. The one or more processors configured to receive, via the communication interface, information regarding the one or more APs from each mobile device of a plurality of mobile devices, the information including, for each mobile device of the plurality of mobile devices an indication of one or more locations from a plurality of locations, and for each location of the one or more locations, an identity of at least one AP of the one or more APs whose wireless signals were received by each mobile device at each location. The one or more processors are also configured to determine, for each AP of the one or more APs, the coverage heatmap for the respective AP from the information, wherein the coverage heatmap comprises a geographic area or geographic volume and a density of locations of the plurality of locations within the geographic area or geographic volume at which wireless signals from the respective AP were received by the plurality of mobile devices.

An example mobile device, according to this description, comprises a communication interface, a memory, and one or more processors communicatively coupled with the memory and the communication interface. The one or more processors are configured to detect, with the communication interface, wireless signals from one or more APs, and obtain information regarding the one or more APs, the information including an identity of each AP of the one or more APs. The one or more processors are further configured to send, via the communication interface, the information to a location server, and, responsive to sending the information to the location sever, receive, via the communication interface, a civic location of the mobile device from the location server, wherein the civic location is determined based on the information sent to the location server, and a coverage heatmap of at least one AP of the one or more APs.

An example device for determining a civic location of a mobile device, according to this description, comprises means for receiving information regarding one or more APs from the mobile device, the information including an identity of each AP of the one or more APs. The device further comprises means for determining a location of the mobile device based on the information and a coverage heatmap for each AP of the one or more APs, wherein the coverage heatmap for each AP of the one or more APs indicates a geographic area or geographic volume within which wireless signals from the respective AP can be received, and a density of mobile device locations within the geographic area or geographic volume at which additional mobile devices received wireless signals from the respective AP. The device further comprises means for determining the civic location of the mobile device based on the location.

An example device for determining a coverage heatmap for each of one or more APs, according to this description, comprises means for receiving information regarding the one or more APs from each mobile device of a plurality of mobile devices, the information including, for each mobile device of the plurality of mobile devices, an indication of one or more locations from a plurality of locations, and for each location of the one or more locations, an identity of at least one AP of the one or more APs whose wireless signals were received by each mobile device at each location. The device further comprises means for determining, for each AP of the one or more APs, the coverage heatmap for the respective AP from the information, wherein the coverage heatmap comprises a geographic area or geographic volume and a density of locations of the plurality of locations within the geographic area or geographic volume at which wireless signals from the respective AP were received by the plurality of mobile devices.

An example device for obtaining a civic location of a mobile device, according to this description, comprises means for detecting wireless signals from one or more APs, and means for obtaining information regarding the one or more APs, the information including an identity of each AP of the one or more APs. The device further comprises means for sending the information to a location server, and means for receiving, responsive to sending the information to the location sever, the civic location of the mobile device from the location server, wherein the civic location is determined based on the information sent to the location server, and a coverage heatmap of at least one AP of the one or more APs.

An example non-transitory computer-readable medium, according to this description, stores instructions for determining a civic location of a mobile device. The instructions comprise code for receiving information regarding one or more APs from the mobile device, the information including an identity of each AP of the one or more APs. The instructions further comprise code for determining a location of the mobile device based on the information and a coverage heatmap for each AP of the one or more APs, wherein the coverage heatmap for each AP of the one or more APs indicates a geographic area or geographic volume within which wireless signals from the respective AP can be received, and a density of mobile device locations within the geographic area or geographic volume at which additional mobile devices received wireless signals from the respective AP. The instructions further comprise code for determining the civic location of the mobile device based on the location.

An example non-transitory computer-readable medium, according to this description, stores instructions for determining a coverage heatmap for each of one or more APs. The instructions comprise code for receiving information regarding the one or more APs from each mobile device of a plurality of mobile devices, the information including, for each mobile device of the plurality of mobile devices an indication of one or more locations from a plurality of locations, and for each location of the one or more locations, an identity of at least one AP of the one or more APs whose wireless signals were received by each mobile device at each location. The instructions further comprise code for determining, for each AP of the one or more APs, the coverage heatmap for the respective AP from the information, wherein the coverage heatmap comprises a geographic area or geographic volume and a density of locations of the plurality of locations within the geographic area or geographic volume at which wireless signals from the respective AP were received by the plurality of mobile devices.

An example non-transitory computer-readable medium, according to this description, stores instructions for obtaining a civic location of a mobile device. The instructions comprise code for detecting wireless signals from one or more APs, and obtaining information regarding the one or more APs, the information including an identity of each AP of the one or more APs. The instructions further comprise code for sending the information to a location server, and receiving, responsive to sending the information to the location sever, the civic location of the mobile device from the location server, wherein the civic location is determined based on the information sent to the location server, and a coverage heatmap of at least one AP of the one or more APs.

Figure 1:
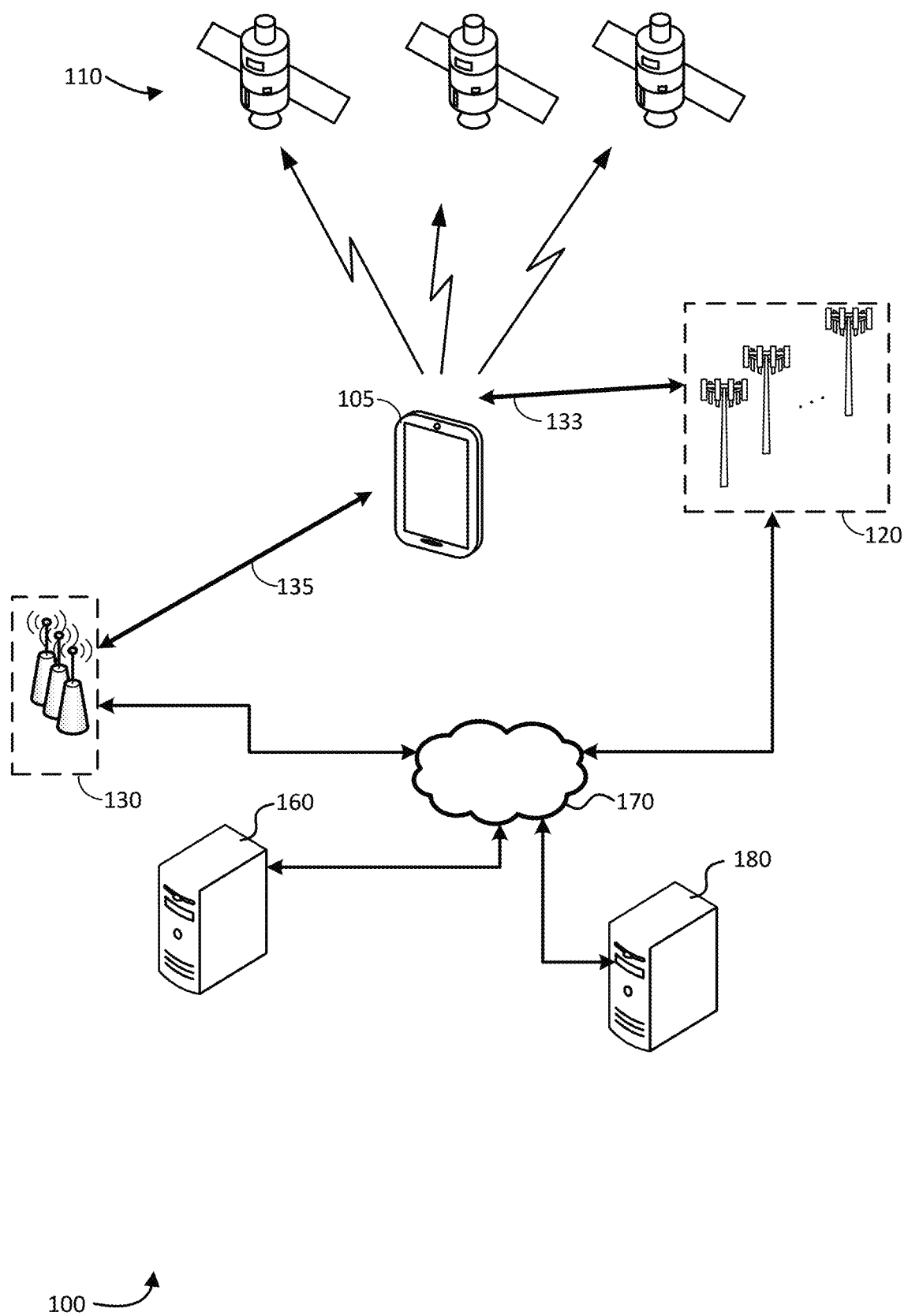
FIG. 1 is a diagram of a positioning system, according to an embodiment.

Like reference symbols in the various drawings indicate like elements, in accordance with certain example implementations. In addition, multiple instances of an element may be indicated by following a first number for the element with a hyphen and a letter or number. For example, multiple instances of an element 110 may be indicated as 110-*a*, 110-*b*, etc. or 110-1, 110-2, etc. When referring to such an element using only the first number, any instance of the element is to be understood (e.g., element 110 may refer to element 110-*a* and/or 110-*b*).

DETAILED DESCRIPTION

Several illustrative embodiments will now be described with respect to the accompanying drawings, which form a part hereof. While some embodiments in which one or more aspects of the disclosure may be implemented as described below, other embodiments may be used, and various modifications may be made without departing from the scope of the disclosure.

During an emergency call in a wireless communication network (e.g., Global System for Mobile communication (GSM), Universal Mobile Telecommunications Service (UMTS), Long Term Evolution (LTE), or New Radio (NR) (also referred to herein as Fifth Generation (5G) NR)), a communication link (also referred to as a connection or a session) may be established between a mobile device (e.g., a User Equipment (UE)) and a Public Safety Answering Point (PSAP). To assist in determining the location of the mobile device, an operator of the wireless communication network (e.g., a mobile service provider) can also provide a location estimate of the mobile device to the PSAP. The determination of the location estimate may be made in any of a variety of ways (some of which are described herein below) and may be based on location-related information received from the mobile device. However, as noted, the location estimate is often provided to the PSAP in geodetic coordinates (e.g. as a latitude, longitude and optionally an altitude). These coordinates typically need to be translated to a corresponding civic location (e.g. a street address and possibly a building and/or room designation) in order to deploy emergency response services (e.g. ambulance, fire, police, etc.). Traditional techniques for translating geodetic coordinates to a civic location have often been inaccurate and unreliable. This can especially apply when a geodetic location has significant error (e.g. 50 meters or more), when even an accurate translation process could assign an incorrect civic location in areas (e.g. urban or suburban) where buildings and personal residences are close together.

To address this and other issues, embodiments are described herein that provide for reverse geo-coding of a geodetic location to a civic location (also referred to as a civic address) using WiFi access points (referred to herein as "WiFi APs" or simply APs) and other types of access node (AN) such as small cell NR gNBs. According to some embodiments, mobile devices can crowdsource data regarding visible APs and ANs (e.g. AP media access control (MAC) address and signal measurements) and current mobile device location. Furthermore, a server can build up a heatmap (or heat volume) corresponding to the wireless coverage of a particular AP or AN and comprising the density of reporting mobile devices in an area (or volume) around the AP or AN. The heatmap or volume can then be compared with a map containing building and street address information to determine the wireless coverage area (also referred to as signal coverage area, coverage area of just coverage) of the AP or AN in terms of civic locations. When the entire coverage area or volume lies within a single building, the corresponding civic location can be assigned to the AP or AN. When a coverage area or volume spans more than one building and/or includes an outdoor area, a probability can be assigned to the civic location of each building (or outdoor area) based on the fraction of the included heatmap or volume. According to some embodiments, measurements such as average Round Trip Time (RTT) and/or Received Signal Strength Indication (RSSI) values can also be used to associate each building or outdoor area (and its corresponding civic location) with an RSSI range and/or RTT range. When a mobile device reports receiving signals from a number of WiFi APs or ANs, the civic location(s) (and probabilities) associated with each of the WiFi APs and/or ANs can be used to determine a most likely civic location of the mobile device. Mobile-device-reported RTTs and RSSIs can also be compared to the expected RSSI and RTT range for each candidate civic location to further determine a most likely civic location. Additional details regarding these embodiments are provided hereinafter.

It should be noted that, although embodiments detailed below are frequently in reference to applications in which the location of a mobile device is determined for purposes of providing emergency services (e.g., providing a civic location to a PSAP), embodiments are not so limited. That is, the techniques for determining a civic location of a mobile device using crowdsourced WiFi AP information can be used in other applications and scenarios (e.g. navigation, person finding, location tracing etc.). It is also noted that while embodiments detailed below may be more typically applied to WiFi APs which may be more common inside buildings, the embodiments may also be applied to small cell ANs (e.g. femtocells), which may be deployed by an operator or a user inside a building and may not always have a known civic location or a known wireless coverage area.

As used herein, a radio frequency (RF) signal or "wireless signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. Also, as described herein, a transmitting device (e.g., a WiFi AP) may be described as being "visible," "seen by," or the like when a receiving device (e.g., a mobile device/UE) receives RF/wireless signals from the transmitting device. Because a receiving device may receive signals from multiple transmitting devices at a given location of the receiving device, the receiving device may "see" many transmitting devices at the given location.

As used herein, the terms "mobile device" and "UE" may be used interchangeably. Additionally, as used herein, the terms "crowdsourcing UE" or "crowdsourcing mobile device" refer to devices used to collect information (e.g. at a server) that can be gathered and analyzed for subsequent usage. Details regarding what types of information is used in such crowdsourcing are provided herein. Furthermore, the terms "target UE" and "target mobile device" refer to a device for which a position determination is to be made. It can be noted that, in some situations, a single mobile device may perform the roles of a crowdsourcing mobile device and a target mobile device at different times. Furthermore, a server used to collect information from crowdsourcing UEs may be the same or different than a server used to determine the position of a target mobile device. Again, additional details follow.

FIG. 1 is a simplified illustration of a positioning system 100 in which a UE 105, location server (LS) 160, and/or other components of the positioning system 100 can use the techniques provided herein for determining an estimated location of UE 105, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; APs 130; LS 160; network 170; and external client 180. Generally, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to LS 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a WiFi WLAN, and the Internet. LTE, 5G and NR are wireless technologies defined, or being defined, by the 3rd Generation Partnership Project (3GPP). Network 170 may also include more than one network and/or more than one type of network.

The base stations 120 and APs 130 are communicatively coupled to the network 170. In some embodiments, the base station 120 may be owned, maintained, and/or operated by a cellular network provider, and may employ any of a variety of wireless technologies, as described herein below. Depending on the technology of the network 170, a base station 120 may comprise a node B, an Evolved NodeB (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a WiFi AP or a Bluetooth® AP, for example. Thus, UE 105 can send and receive information with network-connected devices, such as LS 160, by accessing the network 170 via a base station 120 using a first communication link 133. Additionally or alternatively, because APs 130 also may be communicatively coupled with the network 170, UE 105 may communicate with network connected and Internet connected devices, including LS 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where a base station 120 employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The LS 160 may comprise a server and/or other computing device configured to determine an estimated location of UE 105 and/or provide data (e.g., "assistance data") to UE 105 to facilitate location measurement and/or location determination by UE 105.

According to some embodiments, LS 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in LS 160. In some embodiments, the LS 160 may comprise, a Discovered SLP (D-SLP) or an Emergency SLP (E-SLP). The LS 160 may also comprise an Enhanced Serving Mobile Location Center (E-SMLC) that supports location of UE 105 using a control plane (CP) location solution for LTE radio access by UE 105. The LS 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between LS 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with a known position of the one or more components.

Although terrestrial components such as APs 130 and base stations 120 may be fixed, embodiments are not so limited. Mobile components may be used. Moreover, in some embodiments, a location of the UE 105 may be estimated at least in part based on measurements of RF signals communicated between the UE 105 and one or more other UEs (not shown in FIG. 1), which may be mobile. Direct communication between the one or more other UEs and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location of UE 105 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. As previously noted, embodiments herein can be used to reliably map geodetic locations to civic locations, which may then be provided to an external client 180. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, asset tracking or child or pet location). Additionally or alternatively, the external client 180 may obtain and provide the location of UE 105 to an emergency services provider, government agency, etc. Accordingly, in some embodiments, the external client 180 may comprise a PSAP.

Figure 2:
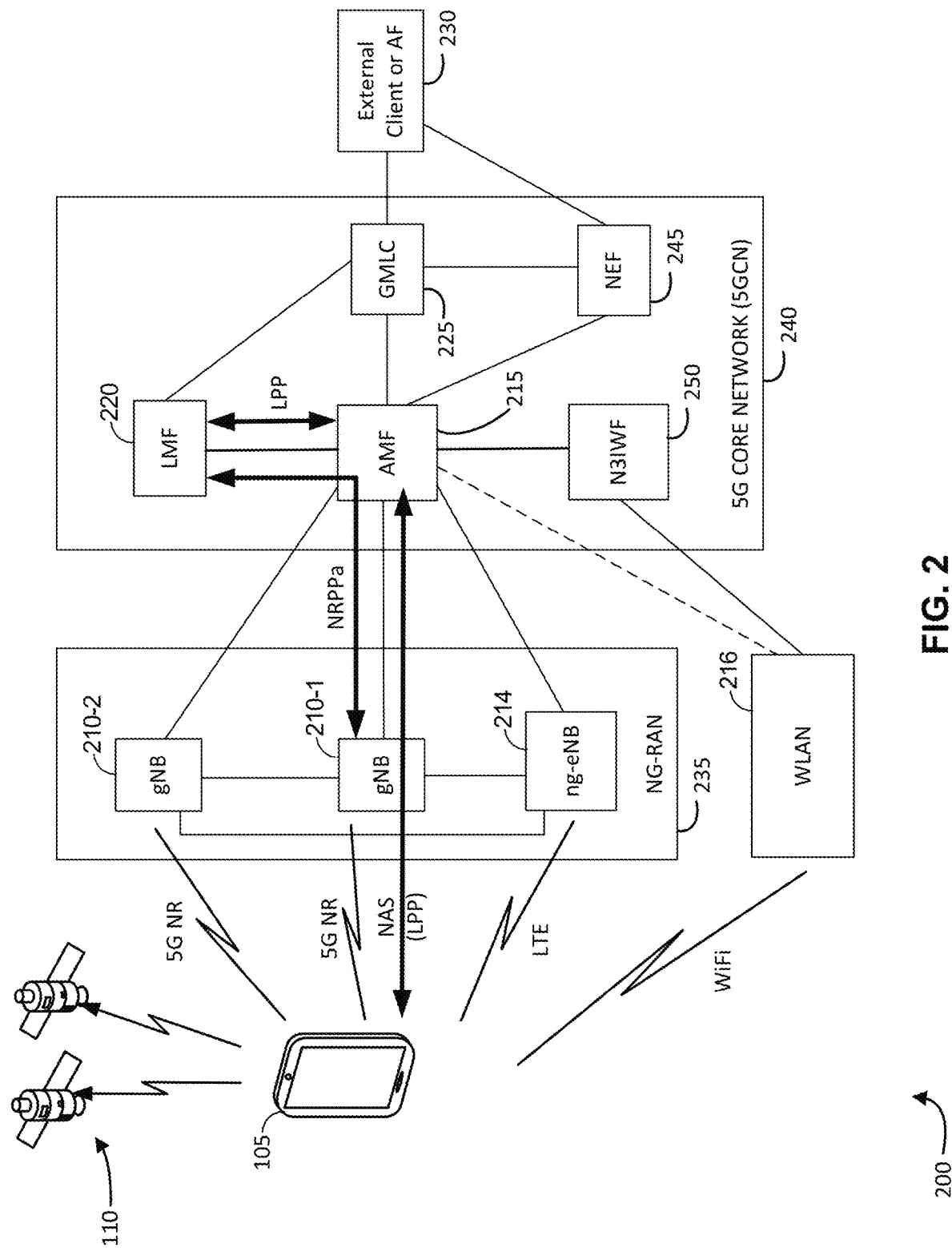
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with LS 160) to implement one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5GCN) 240. A 5G network may also be referred to as an NR network; NG-RAN 235 may be referred to as a 5G RAN or as an NR RAN; and 5GCN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, IRNSS). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long Term Evolution (LTE), High Rate Packet Data (HRPD), IEEE 802.11 WiFi (also referred to as "Wi-Fi"), Bluetooth®, Worldwide Interoperability for Microwave Access (WiMAX™), 5G NR (e.g., using the NG-RAN 235 and 5GCN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5GCN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network. The external client 230 may then comprise a PSAP.

Base stations in the NG-RAN 235 shown in FIG. 2 may correspond to base stations 120 in FIG. 1 and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). Access to the 5G network is provided to UE 105 via wireless communication between the UE 105 and one or more of the gNBs 210, which may provide wireless communications access to the 5GCN 240 on behalf of the UE 105 using 5G NR. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5GCN 240 (e.g., in the case of an untrusted WLAN 216). For example, the WLAN 216 may support IEEE 802.11 WiFi access for UE 105 and may comprise one or more WiFi APs (e.g., APs 130 of FIG. 1). Here, the N3IWF 250 may connect to other elements in the 5GCN 240 such as AMF 215. In some embodiments, WLAN 216 may support another RAT such as Bluetooth. The N3IWF 250 may provide support for secure access by UE 105 to other elements in 5GCN 240 and/or may support interworking of one or more protocols used by WLAN 216 and UE 105 to one or more protocols used by other elements of 5GCN 240 such as AMF 215. For example, N3IWF 250 may support IPSec tunnel establishment with UE 105, termination of IKEv2/IPSec protocols with UE 105, termination of N2 and N3 interfaces to 5GCN 240 for control plane and user plane, respectively, relaying of uplink and downlink control plane Non-Access Stratum (NAS) signaling between UE 105 and AMF 215 across an N1 interface. In some other embodiments, WLAN 216 may connect directly to elements in 5GCN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more ANs. As noted, while FIG. 2 depicts access nodes 210, 214, and 216 configured to communicate according to 5G NR, LTE, and WiFi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location of UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as DL Time Difference Of Arrival (DL-TDOA)), Real Time Kinematic (RTK), Precise Point Positioning (PPP), Differential GNSS (DGNSS), Enhance Cell ID (ECID), angle of arrival (AOA), angle of departure (AOD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol A (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, OTDOA, multi-cell RTT, AOD, and/or ECID. The NRPPa protocol may be used to support positioning of UE 105 using network based position methods such as ECID, AOA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP messages may be transferred between the UE 105 and the LMF 220 via the AMF 215, N3IWF 250, and serving WLAN 216 for UE 105 to support UE assisted or UE based positioning of UE 105 by LMF 220.

With a UE-assisted position method, UE 105 may obtain location measurements and send the measurements to a location server (e.g., LMF 220) for computation of a location estimate for UE 105. For RAT dependent position methods, location measurements may include one or more of a Received Signal Strength Indicator (RSSI), RTT, Reference Signal Received Power (RSRP), Reference Signal Received Quality (RSRQ), Reference Signal Time Difference (RSTD), Time of Arrival (TOA), AOA, Receive Time-Transmission Time Difference (Rx-Tx), Differential AOA (DAOA), AOD, or Timing Advance (TA) for gNBs 210, ng-eNB 214, and/or one or more access points for WLAN 216. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AOA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Network-based positioning methods and RAT dependent UE assisted and UE based positioning methods, including WLAN-based positioning methods, are typically based on a knowledge of where network nodes (e.g., APs and/or base stations) are located, enabling the position of the UE 105 to be determined via multiangulation and/or multilateration. However, according to embodiments herein, information from one or more crowdsourcing UEs can be used to determine a coverage area for each of one or more APs, without necessarily knowing or determining the precise location of each of the APs. The coverage area(s) can be used to determine a civic location of a target UE, as described in more detail hereafter.

FIGS. 3A-4B are diagrams illustrating an example of how information from UEs 105 can be used to crowdsource the coverage area of an AP 130. Here, UEs used for purposes of crowdsourcing are termed crowdsourcing UEs 305, and a WiFi AP for which information is collected is termed an AP of interest 310. As indicated below, a crowdsourcing UE 305 may crowdsource information one or more APs of interest 310 at one or more times and/or one or more locations. It is noted that the same or similar techniques can be used to collect information and determine a coverage area for any access node, such as a gNB 210 or ng-eNB 214. Thus, AP of interest 310 in FIGS. 3A-4B, may be replaced by an AN, such as a gNB 210 or ng-eNB 214, without departing from the techniques described below.

Figure 3A:
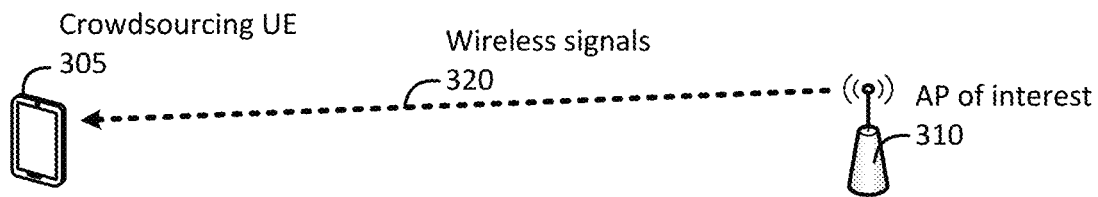
FIGS. 3A and 3B are diagrams illustrating an example of how information from UEs can be used to crowd source the coverage area of an AP.
Figure 3B:

FIG. 3A, illustrates a basic configuration from which information regarding an AP of interest 310 can be gathered from a crowdsourcing UE 305. Here, the crowdsourcing UE 305 can determine its own location (UE location 315, as illustrated in FIG. 3B), obtain an identifier (ID) of the AP of interest 310 (e.g., MAC address, service set ID (SSID), etc.), and optionally obtain one or more measurements of wireless signals 320 transmitted by the AP of interest 310. The crowdsourcing UE 305 can then provide information indicative of UE location 315, the ID of the AP of interest 310, and (optionally) signal measurements to a server (e.g., via NR, LTE, or WiFi-based communication) for determination of the coverage region for the AP of interest 310. As described in more detail hereafter, the server can then use this information, along with other crowdsourcing information, to subsequently identify a location of a target UE. The server, for example, may correspond to LMF 220 or external client 230 in FIG. 2 and/or to LS 160 or external client 180 in FIG. 1, and may be an LMF, SLP, E-SMLC or some other server.

The UE location 315 can be determined in any of a variety of ways, depending on desired functionality, UE capability, available position determination techniques, and/or other such factors. In some instances, for example, the crowdsourcing UE 305 may determine the UE location 315 using a RAT independent position method, such as using a GNSS receiver or sensor data. For example, sensor data may comprise data from sensors of the crowdsourcing UE 305, such as one or more accelerometers, gyroscopes, magnetometers, cameras, and/or the like. This can be used to provide a determination of the UE location 315 based on dead reckoning from a previously-determined location (e.g., a GNSS-based, RTK-based or network-based location determination, etc.) or may be an independent location determination.

In other instances, the UE location 315 may be determined using one or more RAT dependent position methods in association with a wireless network (e.g., WiFi, LTE, or NR network) as previously described. Typically, for RAT dependent position methods, UE 305 obtains location measurements of DL signals received from ANs or APs (e.g. gNBs 210, ng-eNBs 215, WLANs 216) and/or ANs or APs (e.g. gNBs 210, ng-eNBs 215, WLANs 216) obtain location measurements of UL signals received from UE 305, where the ANs or APs do not include AP 310 or any other AP of interest for which a coverage area is to be determined. However, when locations are already known or previously determined for AP 310 and other APs of interest without dependence on location measurements from crowdsourcing UEs used to determine coverage areas for AP 310 and other APs of interest, then location measurements by or of UE 305 may be obtained using AP 310 and other APs of interest.

It can be noted that although location measurements obtained by UE 305 of DL signals from AP 310 can be indicative of an AP location 325 (illustrated in FIG. 3B) of the AP of interest 310, the AP location 325 may not necessarily be known and may not be determined. What is known, however, is that the crowdsourcing UE 305 is able to receive wireless signals from the AP of interest 310 while at the UE location 315. In this way, and by receiving similar information by one or more crowdsourcing UEs 305 at different UE locations over time, a server is able to determine a coverage area of the AP of interest 310. This process is described in more detail in FIGS. 4A-4B. It can be noted that, although a single AP of interest 310 is illustrated, this process can be performed for many (potentially all) APs for which wireless signals are received by crowdsourcing UEs 305 in a wireless network. Moreover, at a given UE location 315 there may be multiple APs visible to the crowdsourcing UE 305, in which case the crowdsourcing UE 305 may provide the server with information regarding one or more of the multiple APs, along with the UE location 315.

Figure 4A:
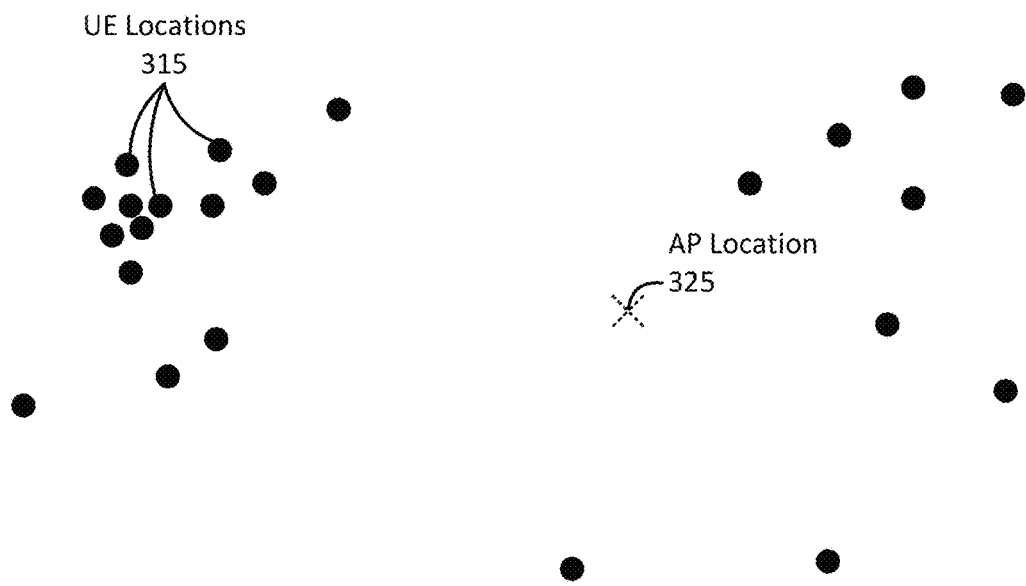
FIGS. 4A and 4B are additional diagrams illustrating an example of how information from UEs can be used to crowd source the coverage area of an AP.

FIG. 4A is a diagram, building on FIG. 3B, that illustrates how multiple UE locations 315 can be received by a server for a given AP of interest 310. Here, as with FIG. 3B, the UE locations 315 represent locations at which one or more crowdsourcing UEs 305 received wireless signals from the AP of interest 310. The AP location 325 is again shown in FIG. 4A, however, as previously noted, it is not needed to determine the coverage area of the AP of interest 310.

To be clear, UE locations 315 represent locations at which a crowdsourcing UE 305 received wireless signals from the AP of interest 310, where the location, the AP identity, and, in some instances, wireless signal measurements are provided to a server. This crowdsourced information corresponding to different UE locations 315 may be provided by different crowdsourcing UEs 305, although a single crowdsourcing UE 305 may provide information for multiple UE locations 315. The number of UE locations 315 can accumulate over time to dozens, hundreds, thousands, or more, resulting in ever-increasing accuracy of the determined coverage area 410 shown in and described below for FIG. 4B. According to some embodiments, older crowdsourcing data (e.g., data older than a threshold length of time) may be purged or ignored to help ensure the use of current, accurate data. For example, this may improve determination of a coverage area if AP 310 is physically moved or if an environment for AP 310 is changed (e.g. such as by adding or removing partitions in an office environment or by erecting or demolishing nearby buildings). Additional information regarding the gathering of information from crowdsourcing UEs 305 is provided hereinafter with regard to FIG. 8.

The server receiving the crowdsourced information may comprise a location server 160 as mentioned previously or another computer system communicatively coupled with the one or more crowdsourcing UEs 305. The server can store the information received from the one or more crowdsourcing UEs 305 in a database and use the information to determine a coverage area for each AP of interest 310 for which the server receives information.

Figure 4B:
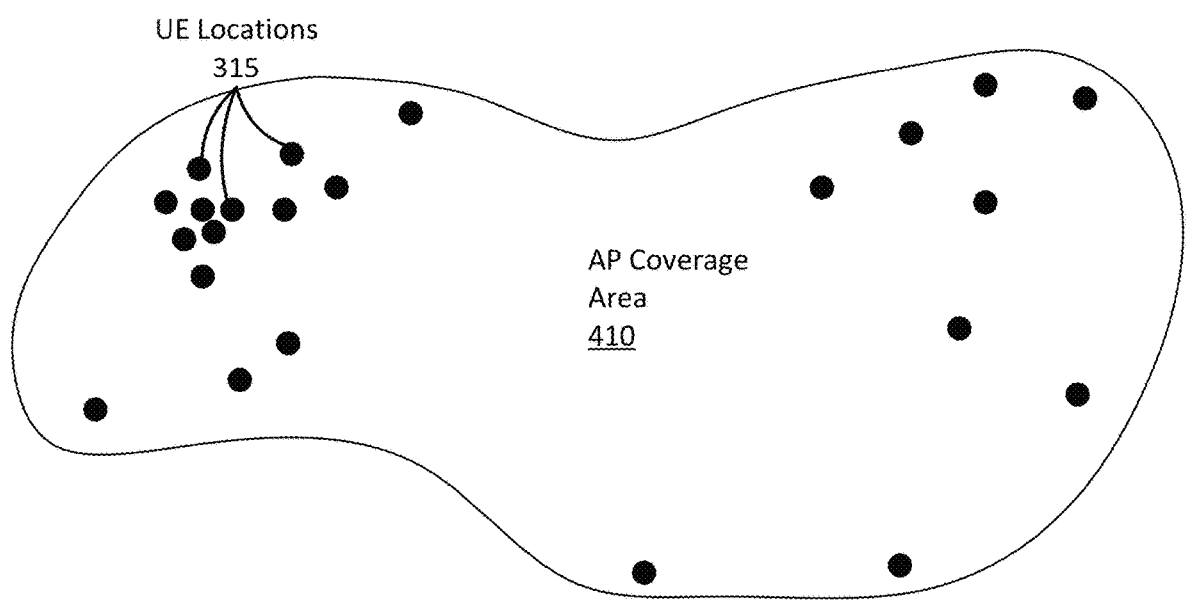

FIG. 4B illustrates an example of how an AP coverage area 410 may be determined from all UE locations 315 of FIG. 4A. (It can be noted that, although frequently described in the embodiments herein as a "coverage area" embodiments may include a "coverage volume" that extends to three dimensions. Determination of such a coverage volume can be particularly helpful, for example, when an AP is visible from multiple stories of a multi-story building.)

The techniques used by a server to determine the coverage area may vary, depending on desired functionality. According to some embodiments, the AP coverage area 410 may be defined by simply connecting the outermost UE locations 315. Alternatively (as illustrated), the AP coverage area 410 may be defined as an area that circumscribes all UE locations 315. According to some embodiments, a server may define the AP coverage area 410 for a particular AP of interest 310 after receiving a threshold number of UE locations 315 corresponding to the AP of interest 310. Moreover, according to some embodiments, the server may implement outlier detection to filter out atypical or anomalous UE locations 315 for an AP of interest 310.

To help increase accuracy of the system, the server can store crowdsourced information and determine corresponding AP coverage areas 410 for many APs of interest 310. For example, a wireless network operator can maintain a server that obtains crowdsourced information and determines coverage areas for all APs within a region covered by the wireless network operator, ultimately enabling the wireless network operator to accurately determine the civic address of target UEs within the wireless network once coverage regions are mapped to civic locations. (Additional details regarding how coverage regions are mapped to civic locations are provided hereinafter.)

Furthermore, according to some embodiments, additional accuracy regarding the location of a target UE may be determined by creating coverage heatmaps for AP coverage areas 410. This can be done using density values of UE locations 315 and/or measurements or wireless signals to determine a likelihood of where a target UE may be located within an AP coverage area. Additional details follow, in reference to FIGS. 5A and 5B.

Figure 5A:
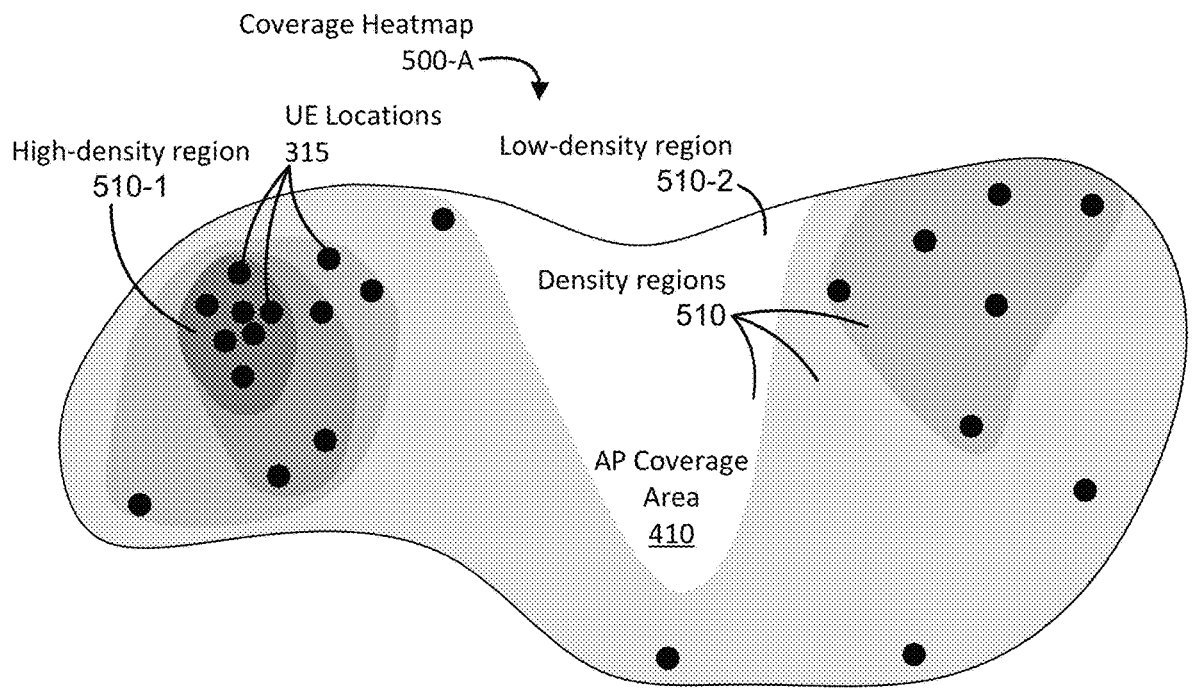
FIGS. 5A and 5B are illustrations of coverage heatmaps, according to some embodiments.

FIG. 5A is an illustration of a first coverage heatmap 500-A corresponding to the AP coverage area 410 of FIG. 4B, according to an example. As can be seen, the first coverage heatmap 500-A comprises the coverage area 410 divided into density regions 510. Darker shaded density regions 510 represent regions having higher densities of UE locations 315. As noted, the coverage heatmap 500-A can be used in the positioning of a target UE to determine the likelihood of whether a target UE is within a density region 510. (To avoid clutter, only a few of the density regions 510 have been labeled in FIG. 5A.)

Density regions are regions within the coverage heatmap 500-A for which UE locations 315 have a density that falls within a particular range. Different density regions can have different ranges. For example, a high-density region 510-1 may be defined by an area having more than 100 UE locations 315 per square meter and a low-density region 510-2 may be defined by an area having fewer than 10 UE locations 315 per square meter. Of course, the density ranges used to define these density regions 510 may be chosen arbitrarily, and the number of different density regions 510 can vary depending on desired functionality. According to some embodiments, ranges may be redefined at certain times (e.g., every week, month, etc.) and/or at certain threshold (e.g., with every additional 1000 UE locations 315 obtained by the server). According to some embodiments, rather than absolute numbers, ranges may be defined by percentages, ratios, or portions (e.g., high density region 510 corresponding to 50% of all UE locations 315 within an area of less than 10% of the AP coverage area 410, with subsequent density regions 510 defined in 10% increments). Because density regions 510 are dependent on the density of UE locations 315 within the AP coverage area 410, they can change over time as the server collects more crowdsourcing data from additional UE locations 315.

Because the density of UE locations 315 in each density region will tend to increase as the overall number of UE locations 315 increases, it may be convenient to define a density of UE locations as a fraction of the overall number of UE locations 315 per unit area of the overall coverage area 420. For example, assume that:

N=total number of UE locations 315;
Nm=number of UE locations 315 in a density region m;
Am=area of the density region m (e.g. in units of square meters).

Then the density Dm of UE locations 315 in the density region m can be obtained (e.g. by a server) as:

$$Dm=Nm/(N*Am). \qquad \text{(Eq. 1)}$$

The density Dm in Equation 1 can remain relatively static (and stable) as the total number of UE locations 315 increases, provided there are already a sufficient number of locations N to dampen statistical fluctuations. The density Dm in Equation 1 can also represent the probability of any UE location 315 being inside a particular unit area of the density region m. For example, when the density Dm is summed (or integrated) over the whole density region m and then summed (or integrated) over all density regions m, the result would be one, as can be required for a summation of probabilities for all possible outcomes.

As just illustrated, density regions 510 may be defined in different ways, depending on desired functionality. As illustrated in FIG. 5A, similar to contours in a contour map, density regions 510 of the coverage heatmap 500-A may be defined as areas within an AP coverage area 410 having a common density or range of densities. Alternatively, a coverage heatmap 500 may be split into predefined portions or subregions. An example of this is illustrated in a "pixelated" coverage heat map 500-B shown in FIG. 5B.

Figure 5B:
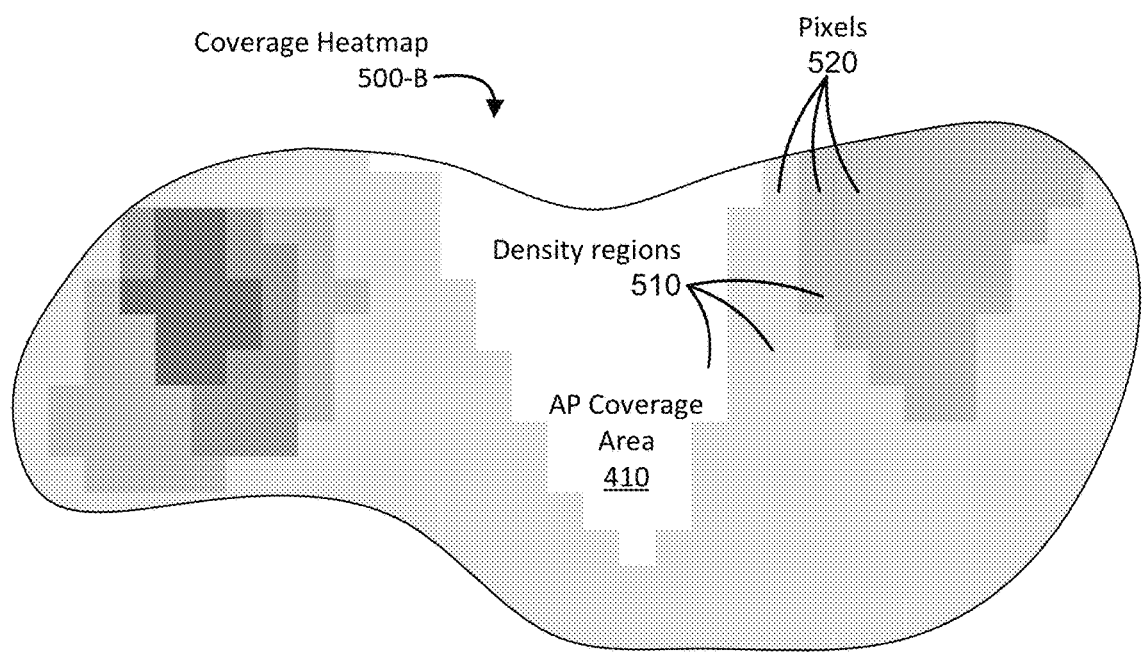

FIG. 5B is a diagram of a second coverage heatmap 500-B illustrating how density within the AP coverage area 410 of FIG. 4B may be represented (e.g. by a server) in a pixilated fashion. Similar to FIG. 5A, density regions 510 are represented by different shades. Here, however, the AP coverage area 410 is separated into a grid of square "pixels" 520, each representing a small portion (e.g., one square meter) within the AP coverage area 410. The density (shade) of each pixel represents the density of UE locations 315 within each pixel. The density in each pixel may be obtained, for example, using Equation 1, where the density region m for Equation 1 corresponds to each pixel.

The size and shapes of the pixels 520 in FIG. 5B may vary. For example, the pixels 520 may be square, rectangular, triangular or hexagonal. The size may be dependent on the number and accuracy of the UE locations 315 provided by the crowdsourcing UEs 305. For example, a large number (e.g. 50,000 or more) of highly-accurate (e.g. location error less than 1 meter) location estimates 315 for the crowdsourcing UEs 305 may allow for pixel size to be 1 square meter or less, whereas fewer and/or less-accurate location estimates may require pixel sizes greater than 1 square meter. The reason for this is that the density of UE locations 315 should preferably be the same or similar for nearby pixels in the same type of area (e.g. a contiguous indoor area or contiguous outdoor area with no impediments or large objects such as furniture or walls between or separating the pixels). This property simply represents a similar or equal likelihood of users of the UEs 315 being in each of the nearby pixels. This property can emerge naturally as a consequence of random statistical sampling for a large number of accurate UE locations 315 but may not emerge for a smaller number of UE locations 315 or where UE locations 315 contain errors larger than the pixel size. However, the property is desirable to ensure that, when using the heatmap data to determine locations for a target UE, that pixels with lower density are not erroneously ignored or downplayed.

Density regions 510 in a coverage heatmap 500-A or 500-B (collectively and generically referred to herein as a coverage heatmap 500), can be used (e.g. by a server) to determine the probability that a target UE is within a particular density region 510 of the coverage heatmap 500. Probabilities can be based on the number of UE locations 315 within respective density regions 510. For example, if a high-density region 510-1 represents 75% and a low-density region 510-2 represents 5% of all UE locations 315 in an AP coverage area 410, a target UE within the AP coverage area 410 may have a corresponding 75% likelihood of being in the high-density region 510-1 and a 5% likelihood of being in the low-density region 510-2. (The percentage likelihood that the target UE would be within the other regions would similarly reflect the percentage of UE locations 315 within the AP coverage area 410.) Thus, if a target UE receives wireless signals from an AP it can be assumed (e.g. by a server) to be within the AP coverage area 410, and the percentage likelihood that the target UE is within a particular density region 510 may be determined in this manner.

Density regions 510 in a coverage heatmap 500 can be further used (e.g. by a server) to determine the probability that a target UE is within a particular sub-region of a particular density region 510 of the coverage heatmap 500. In this case, probabilities can be based on the density of UE locations 315 within respective density regions 510 according to Equation 1. For example, if there are 2% of all UE locations 315 per unit area within the high-density region 510-1, a sub-region within the high-density region 510-1 of area X units (e.g. where a unit area may be one square meter) would contain, on average, 2X % of all UE locations 315. A similar determination can be performed for a sub-region within any other density region, such as low-density region 510-2. This can enable a comparison of the probabilities of a target UE being located in different sub-regions of different density regions and in different sub-regions of the same density region.

It can be noted that the UE locations 315 used to create density regions 510 in coverage heatmap 500 in the example illustrated in FIGS. 5A and 5B may be provided by (a) a large number of crowdsourcing UEs 305 (e.g. tens of thousands) and/or by (b) a small number of crowdsourcing UEs 305 (e.g. a few dozen) which may provide many different UE locations 315 per UE 305 over a period of time (e.g. a few months). Which case applies may depend on the number of different users who frequent a particular coverage area. To avoid weighting results too much for case (b), when both cases (a) and (b) apply, a limit may be placed on the number of locations 315 collected from each UE 305. As an example, a limit of just one location or a few locations per UE 305 per day may be applied. An example where both cases (a) and (b) can apply would be a hotel or a shopping mall, where a small number of UEs 305 used by shop or hotel staff contribute a large number of locations 315 for case (b), and a large number of UEs 305 used by hotel guests or shoppers contribute other locations 315 for case (a). Because hotel or shopping mall staff may typically frequent different areas to hotel guests or shoppers, some limitation on the number of locations 315 collected from UEs 305 belonging to hotel or shopping mall staff may be needed to avoid biasing high density regions 510 towards areas only frequented by hotel or shopping mall staff and not by hotel guests or shoppers.

As a simplification to storing UE locations 315 in a coverage heatmap 500, a server may store a number of UEs located in each density region 510 or a density of UEs (e.g. per unit area or per pixel) for each density region 510. A difference to storing UE locations 315 may be that a UE 305 location is used only to determine a density region 510 in which the UE 305 is located. The server may then store the total number of UEs 305 located in a density region 510 but not their locations. The same simplification may be applied to storing the total number of UEs 305 located within any unit area or within any pixel. The number of UEs that are stored in association with a density region 510, unit area or pixel may not distinguish between the identities of the UEs and may then include multiple instances of the same UE 305 stored by the server at different times. Alternatively, the server may distinguish between different UEs and may include (e.g. count) any particular UE 305 at most once for any density region 510, unit area or pixel.

If measurements of wireless signals are provided by crowdsourcing UEs 305, a coverage heat map 500 may additionally include measurement values or statistics for measurements values. Measurements can include measurements of received signal strength indication (RSSI), RSRP, RSRQ, round trip signal propagation time (RTT) (also referred to as round trip time), and angle of arrival (AOA) for each AP 310. Measurement values may be used in a coverage heat map 500 in a manner similar to the density of UE locations 315, as previously described. That is, an AP coverage area 410 may be divided into regions and average measurement values for those regions may be attributed to those regions. For example, similar to coverage heatmap 500-B, an AP coverage area 410 may be pixilated into pixels of one square meter where statistics of measurement values of wireless signals of the AP of interest 310 obtained from crowdsourcing UEs 305 within each pixel can be applied to the respective pixel. Such statistics may include, for example, an average of the signal measurements, a weighted average, and/or a standard deviation. When subsequently determining the location of a target UE, measurements obtained by the target UE of the AP of interest 310 can be compared with those in each pixel. A likelihood or probability of a target UE being in any pixel of the AP coverage area 410 can then be determined from a degree of similarity of the statistical values determined for the pixel to the values measured by the target UE. For example, in a very simple case, the target UE might be determined to be in the pixel of the AP coverage area 410 having the most similar values to those measured by the target UE.

According to some embodiments, a coverage heatmap 500 with both UE location density values and measurement values may achieve higher accuracy in determining a target UE's location than the use of either density values or measurement values alone. For example, in a given density region 510 in which the target UE has a high likelihood of being located, a server can further use measurement values to identify a subregion, within the given density region 510, having measurement values that most closely match those obtained by the target UE. Additionally or alternatively, a server can achieve similar gains in accuracy by using coverage heatmaps 500 corresponding to multiple APs visible to a target UE to narrow down the target UE's possible locations. Additional details are provided hereinafter with regard to FIGS. 7A and 7B.

Coverage heatmaps 500 can be used by a server when mapping an AP coverage area 410 to one or more civic locations. Examples of this are provided in FIGS. 6A and 6B.

Figure 6A:
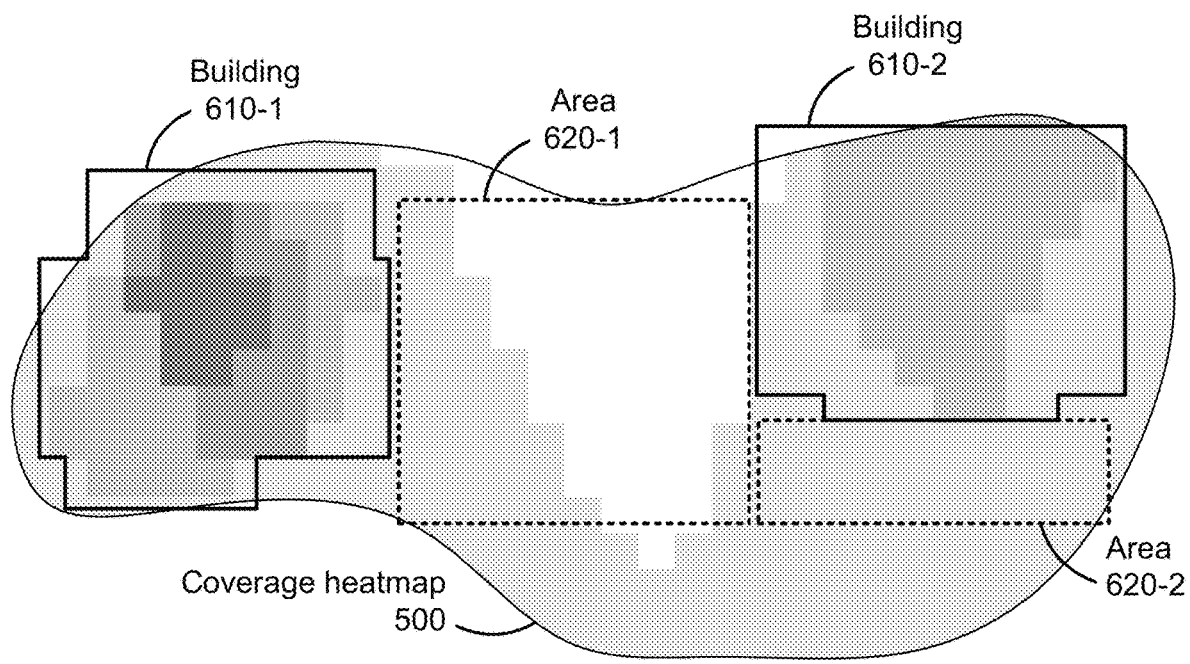
FIG. 6A is an illustration showing the mapping of a coverage heatmap to structures in a civic map, according to an example.

FIG. 6A is an illustration showing the mapping of a coverage heatmap 500 (corresponding to an AP coverage area 410 of an AP of interest 310) to structures in a civic map, according to an example. This can be done by correlating the geodetic coordinates associated with the coverage heatmap 500 with those of a civic map. In this example, the coverage heatmap 500 overlaps with first and second buildings (610-1 and 610-2) and first and second areas (620-1 and 620-2). As can be seen in this example, the buildings 610 correspond to higher-density portions (the darker shades) of the coverage heatmap 500, whereas areas 620 correspond to lower-density portions of the cover heatmap 500. While heatmap 500 is just an example for the purposes of illustration, the heatmap 500 could arise in reality when an AP 310 is located on an upper floor of a high rise building (e.g. building 610-1) with an adjacent high rise building (e.g. building 610-2) nearby, since the space between the buildings would then typically have zero or very few UE locations 315 (e.g. with a few UE locations 315 possible of there was a balcony or if drones were present). According to some embodiments, the coverage heatmap 500 further can be used to determine probabilities that a target UE is located at corresponding civic locations. An example of this is illustrated in FIG. 6B.

Figure 6B:
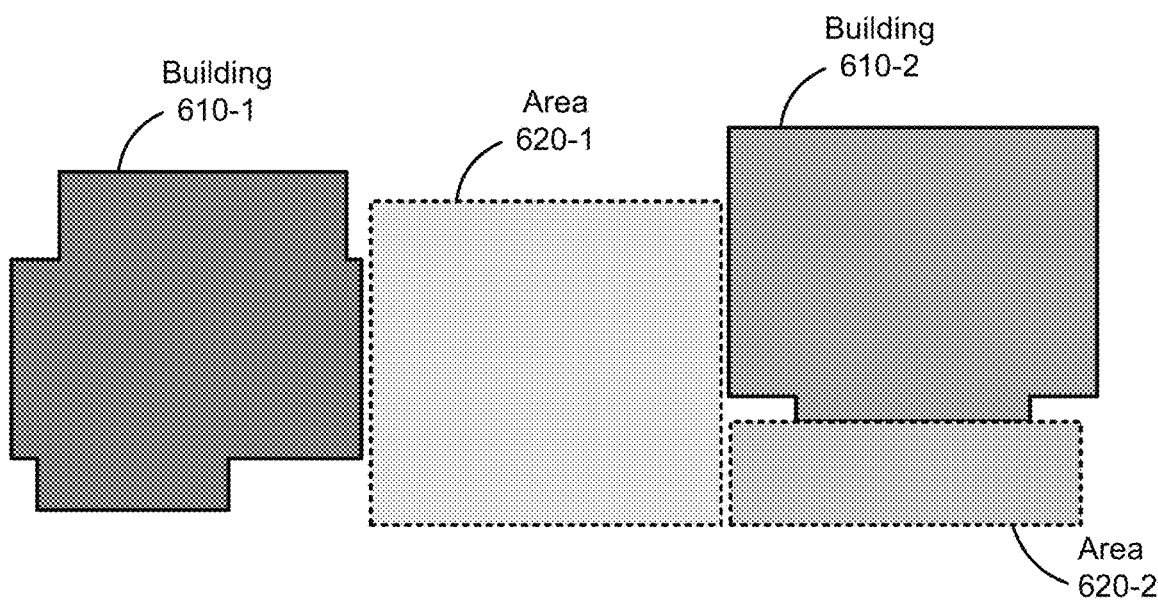
FIG. 6B is an illustration showing probabilities resulting from the mapping of FIG. 6A, according to an example.

FIG. 6B is an illustration showing resulting probabilities that a target UE which detects wireless signals from an AP of interest 310 is located at each of the civic locations corresponding to the coverage heatmap 500 of the AP of interest 310, according to an example. (Again, darker shades show higher probabilities.) That is, by overlaying the civic locations on a coverage heatmap 500 as illustrated in FIG. 6A, probabilities can be determined for each of the civic locations, based on the coverage heatmap 500. Specifically, the probability that a target UE may be located in each location can be determined by the summation of probabilities of all subregions of the coverage heatmap 500 falling within the boundaries of the civic location. In this example, a target UE that detects wireless signals from an AP of interest 310 has the highest probability of being in the first building 610-1 and the lowest probability of being in the first area 620-1. As illustrated in FIG. 6A, there may be portions of the coverage heatmap 500 that may not fall within the boundaries of a civic location. Accordingly, the summation of all probabilities of the civic locations may be less than 100%. According to some embodiments, the determined location of a target UE may be provided as the civic location having the highest probability of all civic locations covered by the cover heatmap 500 (e.g. building 610-1). This determination may be provided to entities such as the target UE itself, an external entity (e.g., a PSAP), or a function/server internal to a wireless communication network provider. Alternatively, probabilities for a plurality of civic locations may be provided if no civic location has a probability above a certain percent (e.g., 50%, 75%, etc.) or if a plurality of civic locations each have a probability above a certain minimum threshold (e.g. 20%, 30%, etc.).

In some embodiments, a most likely geodetic location of a target UE may be determined prior to determining a corresponding civic location. For example, based on density regions 510 within a coverage heatmap 500 and (optionally) wireless signal measurements obtained from a target UE, a server may identify a plurality of candidate locations within the AP coverage area 410 (e.g., dark-shaded pixels 520 in the coverage heatmap 500-B of FIG. 5B) and further determine a probability associated with each candidate location (e.g., based on density and, optionally, wireless signal measurements). A location having the maximum probability may then be identified and mapped to a corresponding civic location.

The continued accumulation of crowdsourcing information can result in increased accuracy over time. That is, crowdsourcing information may initially result in the determination of probabilities for larger civic locations (e.g., buildings and larger areas as illustrated in FIG. 6B), but over time may result in the determination of probabilities of sub-locations within the civic locations, such as rooms or floors within buildings. According to some embodiments, if certain threshold values are met (e.g., a density of UE locations 315 exceeding a threshold value) for a given civic location, and if a map of sub-locations within the civic location are available (e.g., a floor plan of a building), then a server may determine the probabilities for the sub-locations (e.g., in a manner similar to the manner described above for larger civic locations).

It can be noted that the mapping of civic locations to crowdsourcing information can be done at any point. The examples discussed in regard to FIGS. 3A-6B illustrate how civic locations may be applied to a coverage heatmap 500

(as illustrated in FIG. 6A), but embodiments are not so limited. According to some embodiments, the UE locations 315 may be translated to civic locations by a server prior to the determination of an AP coverage area 410. Alternatively, according to some embodiments, civic locations may be mapped to an AP coverage area 410, which may occur prior to the determination of a coverage heatmap 500.

Figure 7A:
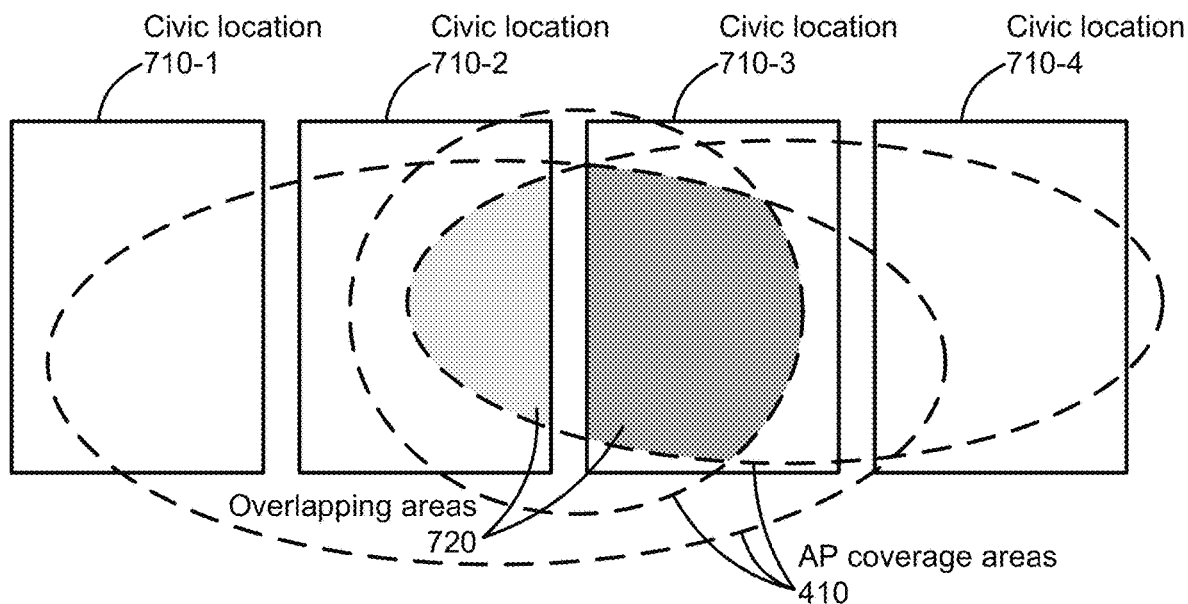
FIGS. 7A and 7B are simplified diagrams illustrating how overlapping AP coverage areas can be used to provide higher accuracy in the determination of the location of a target UE, according to an embodiment.

FIG. 7A is a simplified diagram illustrating how overlapping AP coverage areas 410 can be used to provide higher accuracy in the determination of the location of a target UE, according to an embodiment. In this example, three AP coverage areas 410 collectively cover four civic locations: 710-1 to 710-4. However, overlapping areas 720 of all three of the AP coverage areas 410 occur in only two of the civic locations: 710-2 and 710-3. Thus, if a target UE indicates to a server that it has received wireless signals from all three of the APs of interest corresponding to the three AP coverage areas 410, the server can determine the target UE to be within civic location 710-2 or 710-3.

As indicated by the different shades attributed to the overlapping areas 720 of FIG. 7A, different probabilities may be associated with the different overlapping areas 720, based on coverage heatmaps 500 corresponding to the AP coverage areas 410. That is, in addition to ruling out the possibility that a target UE is located in a non-overlapping portion of an AP coverage 410, a server can determine a probability that the target UE is located within each overlapping area 720 based on the probabilities associated with each of the overlapping areas 720. In the example illustrated in FIG. 7A, densities of coverage heatmaps 500 corresponding to AP coverage areas 410 are combined for each overlapping area 720, resulting in a higher probability that a target UE is located within the overlapping area 720 within civic location 710-3 then the overlapping area 720 within civic location 710-2.

Probabilities may be combined in different manners. In one embodiment, a server may determine the probability of target UE location within each civic location based on each visible AP separately, as described previously (e.g. by summing the probabilities of target UE location in all sub-regions of a heatmap for a visible AP which lie within or correspond to a particular civic location). The resulting probabilities for the individual visible APs for a particular civic location may then be combined by multiplying them to determine a combined probability of UE location (which may just be a relative value) within that civic location, e.g. assuming the probabilities being combined are independent of one another. The civic location with the highest combined probability may then be selected as the most likely civic location of the target UE.

Figure 7B:
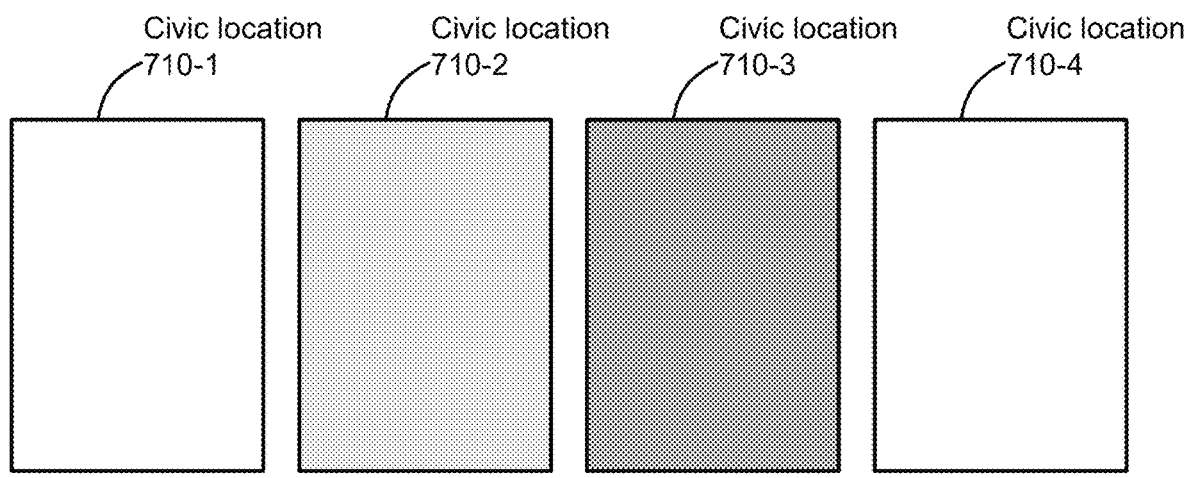

The probabilities can also be combined, as just described, for all the civic locations 710, as illustrated in FIG. 7B, resulting in combined probabilities for the different civic locations 710 similar to those illustrated in FIG. 6B. These civic locations 710 and their associated combined probabilities can be provided to a requesting entity, such as a PSAP, or the civic location 710 with the highest combined probability can be selected as the most likely civic location of the target UE and provided to a requesting entity, such as a P SAP.

The determination of a civic location of a target UE as just described with respect to FIGS. 6B-7B can proceed in either one stage or two stages. In a one stage procedure, a server can determine the probabilities, or the combined probabilities, of different civic locations for the target UE as described and, for example, can select a civic location having a highest probability or highest combined probability. In a two stage procedure, a server can determine the probabilities, or the combined probabilities, that a target UE is located in different density regions, different sub-regions and/or different pixels using the techniques just described, where the probabilities, or the combined probabilities, are based on a coverage heatmap as in FIG. 5B in which civic locations are not necessarily present. A server can then determine a most likely density region, sub-region or pixel for the target UE (as described for civic locations but with density regions, sub-regions and/or pixels used instead of civic locations). The determined density region, sub-region or pixel may be treated as a geodetic location (e.g. with some uncertainty in the case of a density region or sub-region) and can be mapped to a civic location as described for FIG. 6A.

Figure 8:
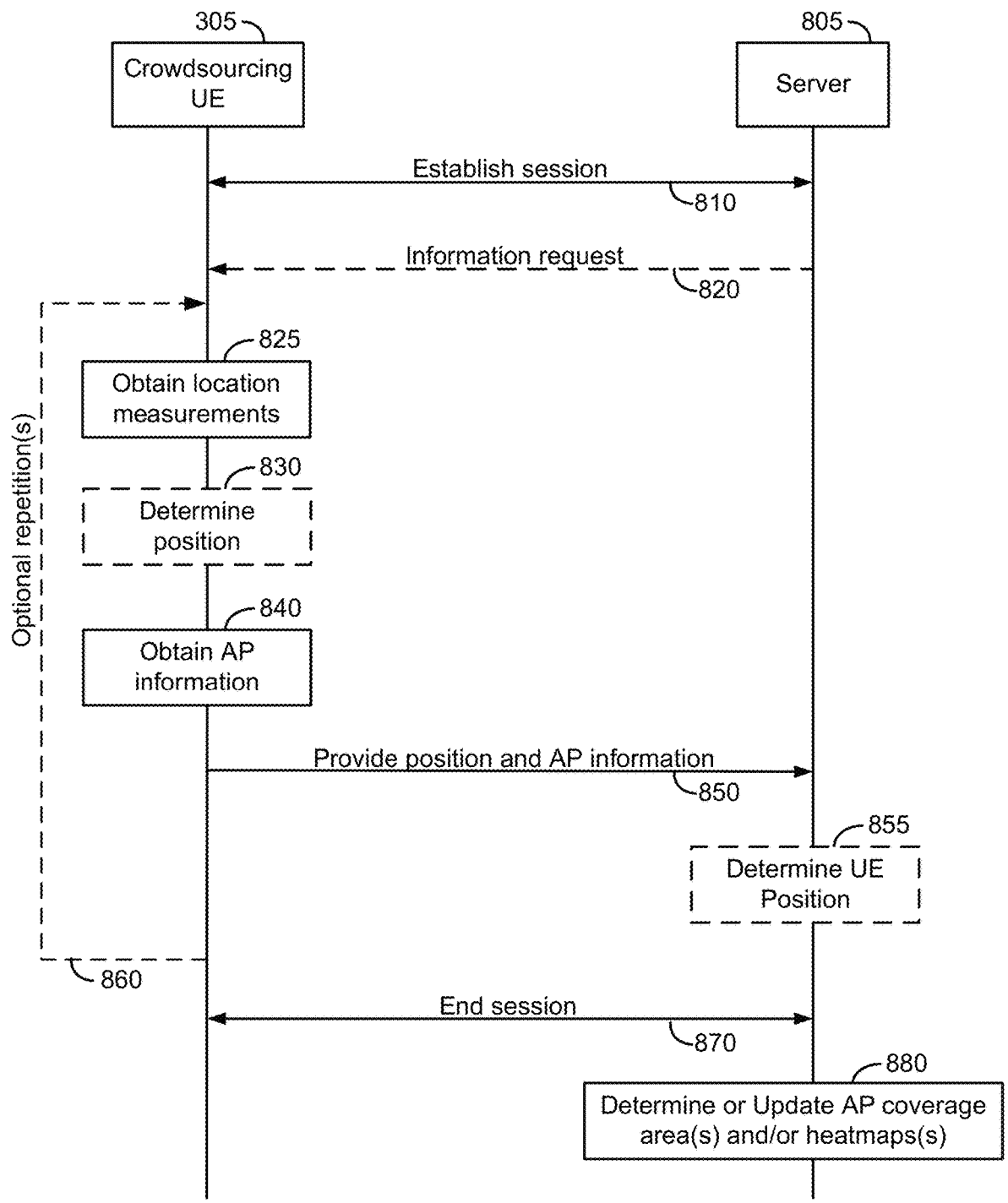
FIG. 8 is a signaling flow diagram of an example process in which a server can collect information from crowdsourcing.

FIG. 8 is a signaling flow diagram of an example process in which a server 805 can collect information from a crowdsourcing UE 305. As illustrated in FIGS. 1 and 2, there may be one or more intervening devices and/or networks between the crowdsourcing UE 305 and server 805. As noted, the crowdsourcing UE 305 may comprise a mobile device (e.g., UE 105 of FIG. 1 and/or FIG. 2) performing a crowdsourcing function, and the server 805 may comprise a logical or physical computer server, such as location server 160, LMF 220, SLP, E-SMLC, and/or another computing device remote from the crowdsourcing UE 305. Moreover, the process illustrated in FIG. 8 can be repeated by the server 805 over time with one or more crowdsourcing UEs 305 to accumulate crowdsourced information (e.g., UE locations 315, AP identities, and optional measurements).

The process may begin at action 810 in which the crowdsourcing UE 305 and server 805 establish a crowdsourcing session. According to some embodiments, the crowdsourcing session may be established over a control plane (e.g. using LPP) or may be established over a user plane (e.g. using the SUPL UserPlane Location Protocol (ULP)). For example, the session may comprise an LPP session or a SUPL ULP session between the server 805 and crowdsourcing UE 305. The establishment of the session at action 810 may be initiated by either the UE 305 sending a request to the server 805 or by the server 805 sending a request to the UE 305.

At action 820, the server 805 can provide the crowdsourcing UE 305 with an information request. This request may include a request for an ID (e.g., MAC address, SSID, or other identifier) of any APs detected by the crowdsourcing UE 305 and (optionally) a request for measurements (e.g., RTT, RSSI, AOA, etc.) of wireless signals of the APs. According to some embodiments, the information request 820 may also explicitly request a location (e.g., UE location 315) and/or location measurements corresponding to a location at which the crowdsourcing UE 305 obtains the AP identity(s) and measurement(s) of the AP(s).

The dashed arrow indicates that action 820 may be optional. This is because, according to some embodiments, an explicit measurement request may not be needed. In such instances, the crowdsourcing UE 305 may provide crowdsourcing information to the server 805 once a session is established (at action 810) without an explicit measurement request.

At block 825, the crowdsourcing UE 305 may obtain location measurements. As previously noted, these may include pseudorange, code phase and/or carrier phase measurements of SVs 110, NR measurements of nearby gNBs 210 (e.g. measurements of RSRP, RSRQ, AOD, AOA, DAOA, Rx-Tx, RSTD, RTT), measurements of APs for nearby WLANs 216, sensor-based measurements, and/or other measurements.

At block 830, the crowdsourcing UE 305 optionally determines its position based on the location measurements obtained at block 825 and using UE based position methods such as A-GNSS, RTK, DL-TDOA, AOA, DAOA, AOD, multi-cell RTT, ECID, WLAN, sensors etc. UE 105 may use assistance data to help determine its position at block 830, where the assistance data may be received from server 805 (e.g. during or following session establishment at action 810) and/or may be received in broadcast information transmitted from a nearby (e.g. serving) gNB 210 or WLAN 216. Block 830 is optional and may not always occur.

At block 840, the crowdsourcing UE 305 obtains AP information to provide to the server 805. Again, this information can include for each of one or more APs visible to the crowdsourcing UE 305, a respective AP identity and optional measurements taken of wireless signals transmitted by the respective AP. In some embodiments, blocks 825 and 840 may be combined.

At action 850, the crowdsourcing UE 305 provides to the server 805 one or more of (i) the position if obtained at block 830; (ii) the AP information obtained at block 840; and (iii) some or all of the location measurements obtained at block 825. In some embodiments, the information sent to the server 805 at block 850 may be sent in two or more different messages (e.g. messages for LPP or ULP), e.g. with the information for each of (i), (ii) and (iii) sent in separate messages or in the same message.

At block 855, if the UE 305 does not provide its position at action 850, the server 805 may determine the UE 305 position using the location measurements provided at action 850 and using UE assisted position methods such as A-GNSS, RTK, DL-TDOA, AOA, DAOA, AOD, multi-cell RTT, ECID, WLAN, sensors etc. Server 805 may also request and receive location measurements of UE 305 obtained by one or more gNBs 210 and/or WLANs 216 (not shown in FIG. 8) to assist with or enable determination of the UE 305 position at block 855 using network-based position methods such as UL-TDOA, AOA or ECID.

As indicated previously, the position provided by the crowdsourcing UE 305 at action 850 or obtained by the server 805 at block 855 may be provided or obtained in geodetic coordinates. These coordinates can be used by the server 805 to help determine an AP coverage area and can be converted to civic locations in the manner indicated in the previously-described embodiments.

Optionally, as indicated by arrow 860, the crowdsourcing UE 305 may repeat the process of obtaining location measurements, optionally determining its position, obtaining AP information, and providing one or more of these to the server 805. These repetitions may be done based on a defined periodicity, triggering event(s) such as UE 305 detecting being at a different location, a schedule, or the like, which may be determined by the server 805 and/or crowdsourcing UE 305, e.g. when the session is established (action 810) and/or when the information is requested (action 820). Once completed, the crowdsourcing UE 305 and server 805 can end the session, at action 870. In another embodiment, the whole process shown in FIG. 8 may be repeated by UE 305 and or by server 805 at periodic intervals, when certain events occur in UE 305 (e.g. such as detecting a different set of visible APs) or whenever UE 305 requests location related information from server 805 or whenever server 805 requests location related information from UE 305 for other purposes.

At block 880, the server 805 uses the information received at one or more instances of action 850 and determined at one or more instances of block 855, when block 855 occurs, to determine or update a coverage area and heatmap for each of one or more APs indicated by UE 305 at action(s) 850. The determination or updating at block 880 may be as described for FIGS. 3A-6A, and may make use of information received from other crowd souring UEs 305 for which a process similar or identical to that shown in FIG. 8 also occurs.

In order to use coverage areas and heatmaps for one or more APs (e.g. as obtained according to the signaling flow in FIG. 8) to obtain a civic location of a target UE, a signaling flow similar to FIG. 8 may be used by the target UE (in place of UE 305 in FIG. 8) and a server 805. The signaling flow may retain each of the actions and blocks described previously for FIG. 8 with the exception of action 825 which can be optional, action 830 which can be omitted, action 860 which is omitted, and block 880 which is typically omitted. In addition, the server 805 can now always perform block 855 to determine the target UE position, but now determines a civic location of the target UE based on the AP information received at action 850 and obtained by the target UE at block 840. The determination of the UE civic location at block 855 may use the techniques described previously for FIGS. 6B-7B. For example, determination of the UE civic location may use a single stage, where no geodetic location of the target UE is obtained, or may proceed in two stages where a geodetic location of the target UE is first obtained after which a civic location of the target UE is obtained based on the geodetic location. The server 805 may then provide the civic location of the mobile device to the mobile device or to an entity requesting the civic location of the mobile device such as external client 230 which may be a PSAP.

Figure 9:
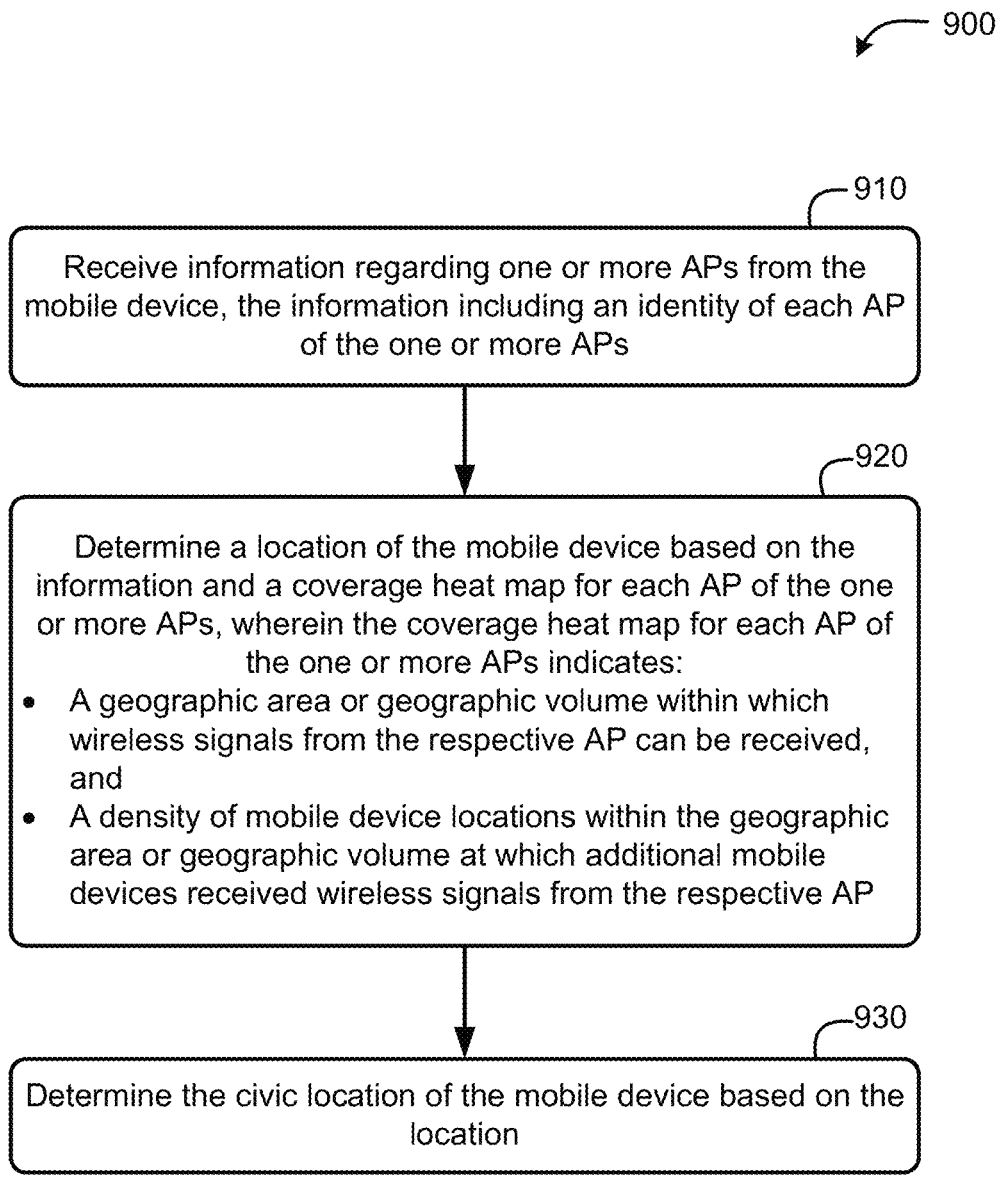
FIG. 9 is a flow diagram of a method of determining a civic location of a mobile device, according to an embodiment.
Figure 13:
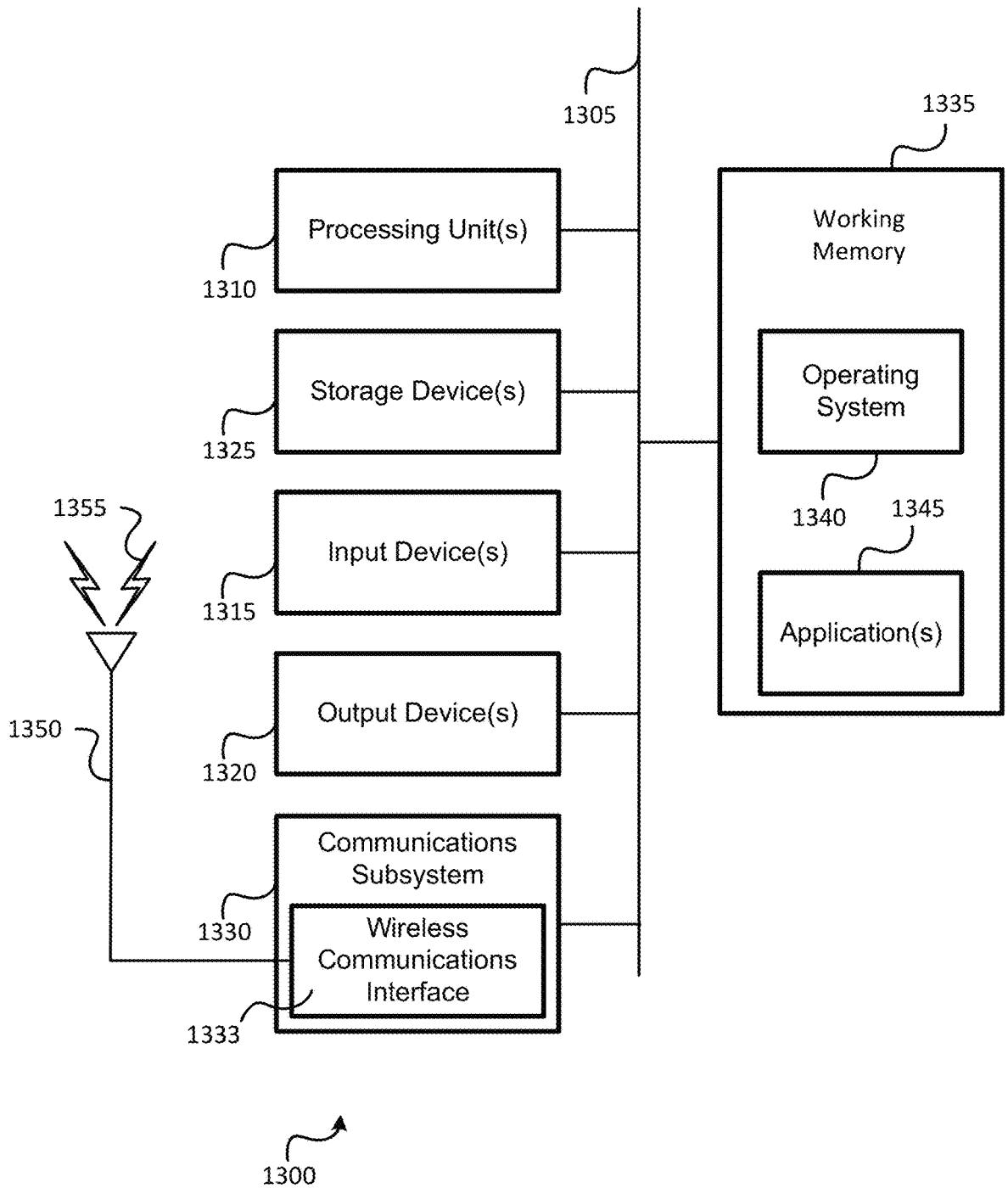
FIG. 13 is a block diagram of an embodiment of a computer system, which can be utilized in embodiments as described herein.

FIG. 9 is a flow diagram of a method 900 of determining a civic location of a mobile device, according to an embodiment. Means for performing the functionality illustrated in one or more of the blocks shown in FIG. 9 may be performed by hardware and/or software components of a server, such as location server 160 of FIG. 1, LMF 220 of FIG. 2 or an SLP, E-SMLC or External Client 180 or 230. Example components of a server are illustrated in FIG. 13, which are described in more detail below. Here, the mobile device may comprise a UE (e.g., target UE 105, crowdsourcing UE 305) as described previously herein.

At block 910, the functionality comprises receiving information regarding one or more WiFi APs from the mobile device, the information including an identity of each WiFi AP of the one or more WiFi APs. As previously indicated, the identity may comprise a unique identifier of each of the one or more WiFi APs, such as a MAC address, SSID, etc. As described previously with regard to FIG. 8, the information may be provided in a communication session between the mobile device and server. Moreover, the information can further include signal measurements (e.g., RSSI, RTT, and/or AOA) for each of the one or more WiFi APs.

Means for performing functionality at block 910 may comprise, for example, a bus 1305, processing unit(s) 1310, communications subsystem 1330, and/or other components of a server, as illustrated in FIG. 13.

At block 920, the functionality comprises determining a location of the mobile device based on the information and a coverage heatmap for each WiFi AP of the one or more WiFi APs. The coverage heatmap for each WiFi AP of the one or more WiFi APs may indicate a geographic area or geographic volume within which wireless signals from the respective WiFi AP can be received, and a density of mobile device locations within the geographic area or geographic volume at which additional mobile devices received wireless signals from the respective WiFi AP. As indicated in the embodiments above, these additional mobile devices may comprise crowdsourcing UEs 305. Example coverage heatmaps are illustrated in FIGS. 5A to 6B. As noted, various aspects of coverage heatmaps may vary, including format, granularity, and the like.

According to some embodiments, the coverage heatmap for each WiFi AP of the one or more WiFi APs may indicate the density of mobile device locations within the geographic area or geographic volume wherein geographic area or geographic volume comprises one or more regions, and wherein the density of mobile device locations for each of one or more regions comprises, a number of mobile device locations, a number of mobile devices, a fraction or portion of a total number of mobile device locations or total number of mobile devices within the geographic area or geographic volume, a probability that mobile devices within the geographic area or geographic volume are in the respective region, or a combination of these. As indicated in the embodiments described above, a probability may be extracted from a density, and/or a fraction or portion (e.g., percentage) of the total number of mobile device locations or the total number of mobile devices may be used to define different density regions. Additionally or alternatively, a region may comprise a sub-area, a sub-volume, a unit area, a unit volume, a pixel or a civic location.

As indicated in the previously-described embodiments (e.g. as described for FIGS. 6B, 7A and 7B), some embodiments may first identify a geodetic or civic location in which a target mobile device has a maximum likelihood of being located. Thus, according to some embodiments, determining the location of the mobile device based on the information and the coverage heatmap for each WiFi AP of the one or more WiFi APs may comprise: determining a plurality of candidate locations for the mobile device; determining a probability of correspondence of each candidate location of the plurality of candidate locations to an actual location of the mobile device; and selecting, as the location, the candidate location of the plurality of candidate locations with a maximum probability of correspondence to the actual location of the mobile device. Moreover, according to some embodiments, determining the probability of correspondence of each candidate location of the plurality of candidate locations to the actual location of the mobile device may be based on the density of the mobile device locations for each respective WiFi AP of the one or more WiFi APs at each candidate location. In some embodiments the information received by the server may include first signal measurements for each WiFi AP of the one or more WiFi APs, where the coverage heatmap for each WiFi AP of the one or more WiFi APs includes statistics for second signal measurements obtained by the additional mobile devices at the mobile device locations within the geographic area or geographic volume. In such instances, determining the probability of correspondence of each candidate location of the plurality of candidate locations to the actual location of the mobile device may be based on a correspondence of the first signal measurements to the second signal measurements for each candidate location. As indicated in the embodiments above, the first signal measurements and second signal measurements may include at least one or an RSRP, RSRQ, RSSI, RTT, AOA, or a combination of these. The statistics for second signal measurements may comprise an average of the second signal measurements, a weighted average of the second signal measurements, a standard deviation of the second signal measurements, or some combination of these.

Means for performing functionality at block 920 may comprise, for example, a bus 1305, processing unit(s) 1310, and/or other components of a server, as illustrated in FIG. 13.

At block 930, the functionality comprises determining the civic location of the mobile device based on the location. In some embodiments, the location may comprise the civic location. In other embodiments, the location may comprise a geodetic location, which may be mapped to the civic location, e.g. using a map (e.g. as described for FIG. 6A), a building plan or a database that cross references geodetic locations and civic locations. In some embodiments, when the location is a geodetic location, determining the civic location based on the location may comprise identifying a second location on a map or plan based on the location, and determining the civic location based on the second location on the map or plan. According to some embodiments, the civic location of the mobile device may further be provided to an entity such as an entity requesting the civic location, a device internal to a mobile provider network, or the mobile device itself.

Means for performing functionality at block 930 may comprise, for example, a bus 1305, processing unit(s) 1310, and/or other components of a server, as illustrated in FIG. 13.

Figure 10:
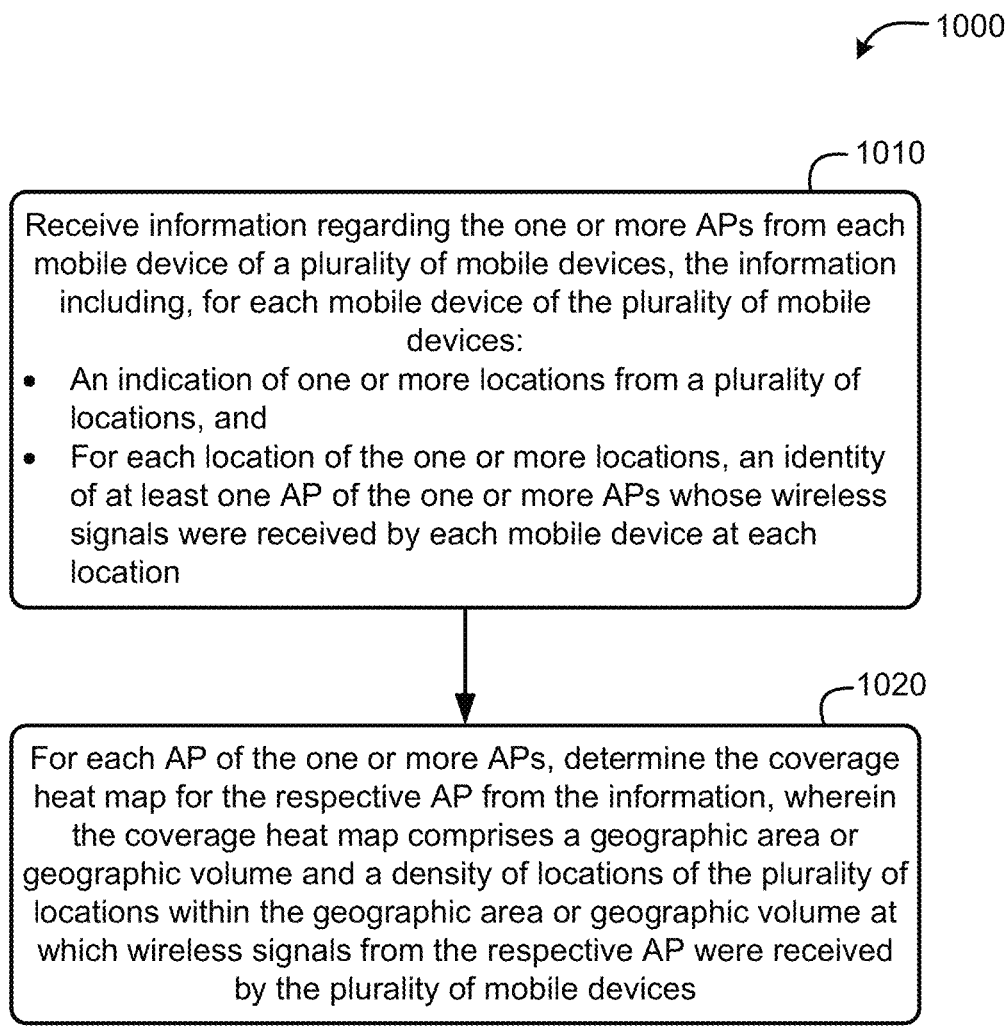
FIG. 10 is a flow diagram of a method of determining a coverage heatmap for each of one or more WiFi APs, according to an embodiment.

FIG. 10 is a flow diagram of a method 1000 of determining a coverage heatmap for each of one or more WiFi APs, according to an embodiment. Similar to FIG. 9, means for performing the functionality illustrated in one or more of the blocks shown in FIG. 10 may be performed by hardware and/or software components of a server, such as location server 160 of FIG. 1, LMF 220 of FIG. 2, an SLP, E-SMLC or external client 180 or 230. Although the server may be the same as the server determining the civic location of a mobile device (e.g., executing the method in FIG. 9), it may be a different server in other embodiments. Example components of a server are illustrated in FIG. 13, which are described in more detail below. Here, the mobile device may comprise a UE (e.g., a UE 105 or a crowdsourcing UE 305) as described previously herein.

At block 1010, the functionality comprises receiving information regarding the one or more WiFi APs from each mobile device of a plurality of mobile devices. The information may include, for each mobile device of the plurality of mobile devices: an indication of one or more locations from a plurality of locations; and, for each location of the one or more locations, an identity of at least one WiFi AP of the one or more WiFi APs whose wireless signals was received by each mobile device at each location. Here, each mobile device of the plurality of mobile devices may comprise a crowdsourcing mobile device (e.g., a mobile device configured for crowdsourcing, such as crowdsourcing UE 305), which may provide information to the server in a communication session as indicated in the FIG. 8. Further, each location from the plurality of locations may be associated with a point, an area or volume of a predetermined size, a pixel, an area or volume defining a portion of a structure or portion of a civic location, or a combination of these.

Means for performing functionality at block 1010 may comprise, for example, a bus 1305, processing unit(s) 1310, communications subsystem 1330, and/or other components of a server, as illustrated in FIG. 13.

At block 1020, the functionality comprises, for each WiFi AP of the one or more WiFi APs, determining the coverage heatmap for the respective WiFi AP from the information, where the coverage heatmap comprises a geographic area or geographic volume and a density of locations of the plurality of locations within the geographic area or geographic volume at which wireless signals from the respective WiFi AP were received by the plurality of mobile devices. The density of locations of the plurality of locations at which the wireless signals from the respective WiFi AP were received by the plurality of mobile devices may be determined for each of one or more regions within the geographic area or geographic volume and, for each region, may comprise a number of locations, a number of mobile devices, a fraction or portion of a total number of locations or total number of mobile devices within the geographic area or geographic volume, a probability that mobile devices within the geographic area or geographic volume are in the respective region, or a combination of these. For example, a region may comprise a sub-area, a sub-volume, a unit area, a unit volume, a pixel or a civic location.

Means for performing functionality at block 1020 may comprise, for example, a bus 1305, processing unit(s) 1310, and/or other components of a server, as illustrated in FIG. 13.

In some embodiments, the information received at block 1010 may include signal measurements for the one or more WiFi APs, where the signal measurements are obtained by each mobile device of the plurality of mobile devices at each of the one or more locations from the plurality of locations. These signal measurements can include an RSRP, RSRQ, RSSI, RTT, AOA, or a combination of these. In such instances, the signal measurements can be used in conjunction with, and/or included in, a coverage heatmap 500 of density values for position determination. Thus, some embodiments of the method 1000 may comprise determining the coverage heatmap for each WiFi AP of the one or more WiFi APs by determining statistics for the signal measurements for the respective WiFi AP at each location of the plurality of locations at which at least one mobile device of the plurality of mobile devices received wireless signals from the respective WiFi AP. Again, the statistics may include an average of the signal measurements, a weighted average of the signal measurements, a standard deviation of the signal measurements, or some combination of these.

Figure 11:
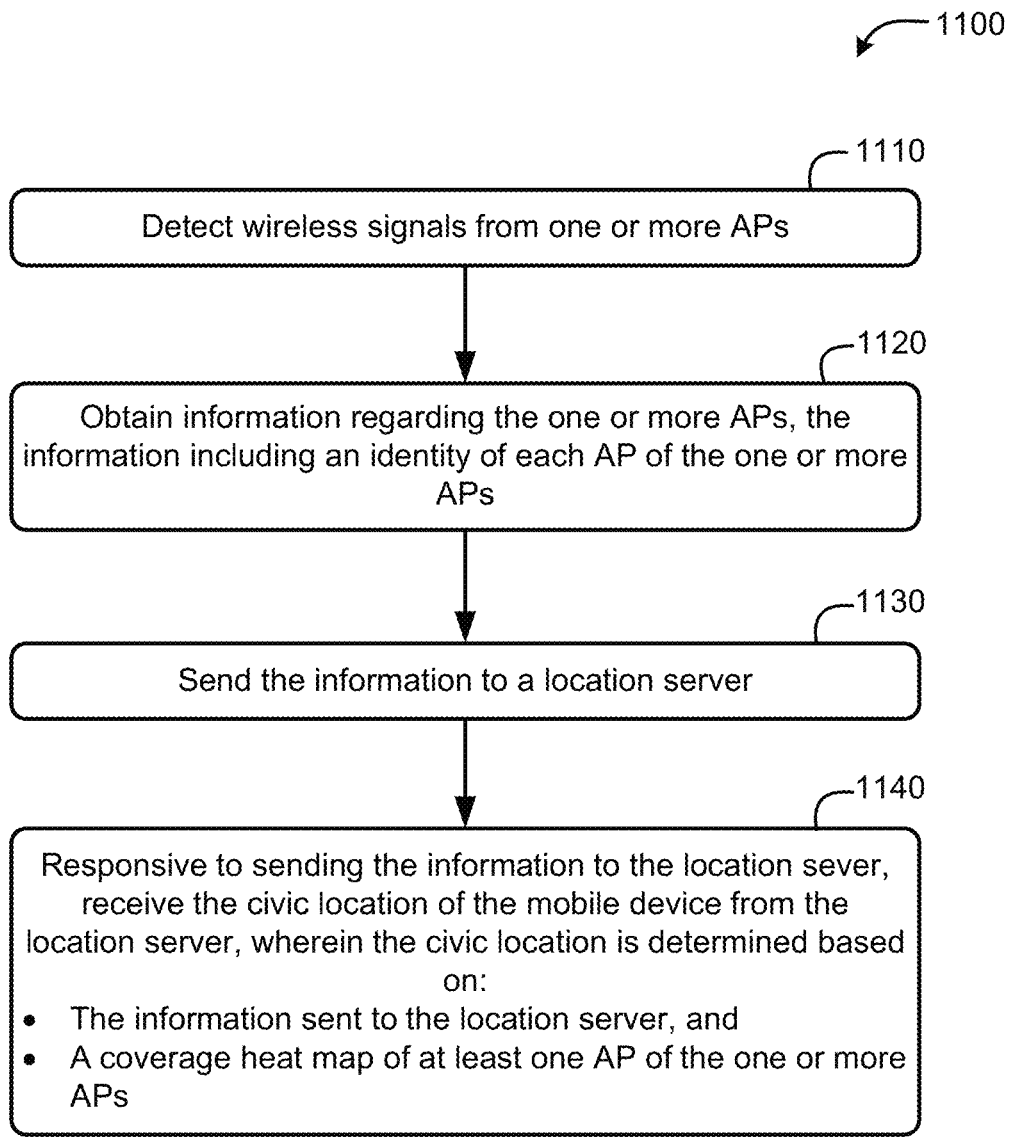
FIG. 11 is a flow diagram of a method of determining a civic location of a mobile device, according to an embodiment.
Figure 12:
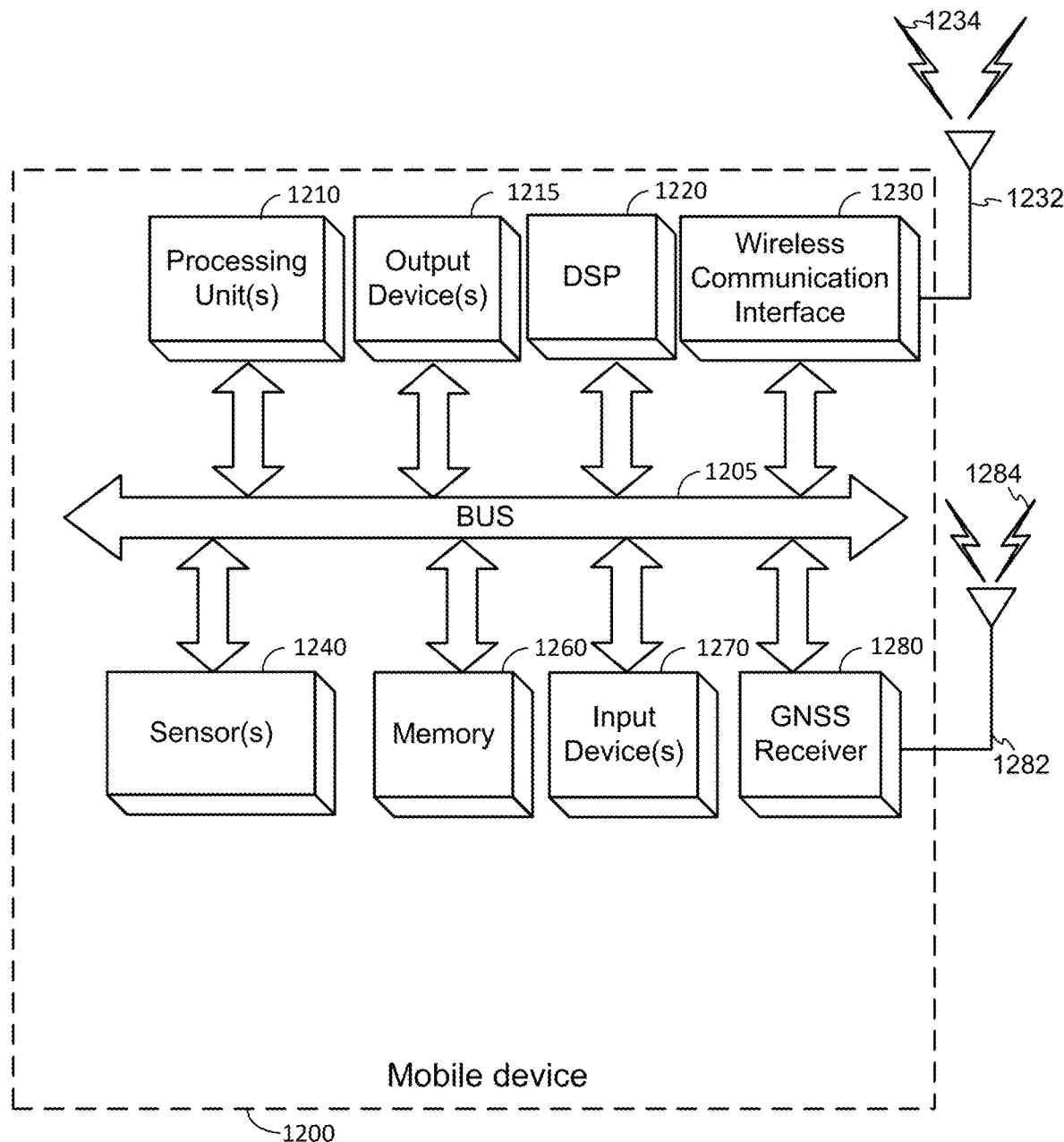
FIG. 12 is a block diagram of an embodiment of a UE, which can be utilized in embodiments as described herein.

FIG. 11 is a flow diagram of a method 1100 of obtaining a civic location of a mobile device, according to an embodiment. Means for performing the functionality illustrated in one or more of the blocks shown in FIG. 11 may be performed by hardware and/or software components of a mobile device, such as the UE 105 of FIGS. 1 and 2. In particular, the functionality illustrated in FIG. 11 may be performed by a target UE as described in the embodiments above. Example components of a mobile device are illustrated in FIG. 12, which are described in more detail below.

At block 1110, the functionality comprises detecting wireless signals from one or more WiFi APs, and the functionality at block 1120 comprises obtaining information regarding the one or more WiFi APs, where the information includes an identity of each WiFi AP of the one or more WiFi APs. As noted in the previously-described embodiments, a mobile device (e.g., target UE) within a coverage area of one or more WiFi APs may receive wireless signals broadcast by the one or more WiFi APs, which may include identification information of the one or more WiFi APs. This identification information may include a unique identifier, such as a MAC address, SSID, or the like.

Means for performing functionality at blocks 1110 and 1120 may comprise, for example, a bus 1305, processing unit(s) 1310, communications subsystem 1330, and/or other components of a server, as illustrated in FIG. 13.

The functionality at block 1130 comprises sending the information to a location server, such as a location server 160, an LMF 220, an SLP, an E-SMLC or an external client 180 or 230. Again, information may be provided as part of a communication session with the location server as illustrated in FIG. 8 as previously described. The information may be sent in accordance with any governing protocols and/or standards related to the communication session, such as using LPP or SUPL ULP protocols.

Means for performing functionality at block 1130 may comprise, for example, a bus 1305, processing unit(s) 1310, communications subsystem 1330, and/or other components of a server, as illustrated in FIG. 13.

Finally, at block 1140, the functionality comprises, responsive to sending the information to the location sever, receiving the civic location of the mobile device from the location server, where the civic location is determined (e.g. by the location server) based on the information sent to the location server and a coverage heatmap of at least one WiFi AP of the one or more WiFi APs.

In embodiments, the functionality may further include obtaining first signal measurements for at least one WiFi AP of the one or more WiFi APs, and including the first signal measurements in the information sent to the location server, where the civic location is further determined (e.g. by the location server) based on the first signal measurements. For example, the first signal measurements may include an RSRP, RSRQ, RSSI, RTT, AOA, or any combination of these. The first signal measurements may be associated with statistics in a coverage heatmap for each of the one or more WiFi APs. Accordingly, the coverage heatmap for the least one WiFi AP of the one or more WiFi APs may include statistics for second signal measurements obtained by additional mobile devices at a plurality of locations within a geographic area or geographic volume within which wireless signals from the least one WiFi AP of the one or more WiFi APs can be received. In such embodiments, determining the civic location (e.g. by the location server) may further comprise determining a probability that each candidate location in a plurality of candidate locations corresponds to an actual location of the mobile device, based on a correspondence of the first signal measurements to statistics for the second signal measurements for each candidate location. For example, the statistics may include an average, a weighted average, a standard deviation or some combination of these.

Means for performing functionality at block 1130 may comprise, for example, a bus 1305, processing unit(s) 1310, communications subsystem 1330, and/or other components of a server, as illustrated in FIG. 13.

As noted previously, the various WiFi APs that are used to determine a civic location of a target UE (e.g. as described for FIGS. 9 and 11), or for which coverage heatmaps are obtained (e.g. as described for FIG. 10), may include WiFi APs for WLANs 216 in FIG. 2 such as APs which support IEEE 802.11 protocols. However, the WiFi APs may not always be so limited and can include APs supporting Bluetooth and/or ANs supporting NR (such as gNBs 210) or LTE (such as ng-eNBs 214) as well as other types of AP and AN.

FIG. 12 illustrates an embodiment of a mobile device 1200, which can be utilized as described herein above (e.g., in association with FIGS. 1-11) with regard to a mobile device and/or UE. For example, the mobile device 1200 may correspond to UE 105 in FIGS. 1-2 or UE 305 in FIGS. 3A and 8, and can perform one or more of the functions of the method shown in FIG. 11. It should be noted that FIG. 12 is meant only to provide a generalized illustration of various components, any or all of which may be utilized as appropriate. It can be noted that, in some instances, components illustrated by FIG. 12 can be localized to a single physical device and/or distributed among various networked devices, which may be disposed at different physical locations. Furthermore, as previously noted, the functionality of each of the UEs discussed in the previously described embodiments may be executed by one or more of the hardware and/or software components illustrated in FIG. 12.

The mobile device 1200 is shown comprising hardware elements that can be electrically coupled via a bus 1205 (or may otherwise be in communication, as appropriate). The hardware elements may include a processing unit(s) 1210 which can include without limitation one or more general-purpose processors, one or more special-purpose processors (such as digital signal processor (DSP) chips, graphics acceleration processors, application specific integrated circuits (ASICs), and/or the like), and/or other processing structures or means. As shown in FIG. 12, some embodiments may have a separate DSP 1220, depending on desired functionality. Location determination and/or other determinations based on wireless communication may be provided in the processing unit(s) 1210 and/or wireless communication interface 1230 (discussed below). The mobile device 1200 also can include one or more input devices 1270, which can include without limitation one or more keyboards, touch screens, touch pads, microphones, buttons, dials, switches, and/or the like; and one or more output devices 1215, which can include without limitation one or more displays (e.g., touch screens), light emitting diodes (LEDs), speakers, and/or the like.

The mobile device 1200 may also include a wireless communication interface 1230, which may comprise without limitation a modem, a network card, an infrared communication device, a wireless communication device, and/or a chipset (such as a Bluetooth® device, an IEEE 802.11 device, an IEEE 802.15.4 device, a WiFi device, a WiMAX device, a WAN device, and/or various cellular devices, etc.), and/or the like, which may enable the mobile device 1200 to communicate with other devices as described in the embodiments above. The wireless communication interface 1230 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1232 that send and/or receive wireless signals 1234. According to some embodiments, the wireless communication antenna(s) 1232 may comprise a plurality of discrete antennas, antenna arrays, or any combination thereof. The antenna(s) 1232 may be capable of transmitting and receiving wireless signals using beams (e.g., Tx beams and Rx beams). Beam formation may be performed using digital and/or analog beam formation techniques, with respective digital and/or analog circuitry. The wireless communication interface 1230 may include such circuitry.

Depending on desired functionality, the wireless communication interface 1230 may comprise a separate receiver and transmitter, or any combination of transceivers, transmitters, and/or receivers to communicate with WiFi APs, base stations (e.g., ng-eNBs and gNBs), and other terrestrial transceivers and wireless devices. The mobile device 1200 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 1200 can further include sensor(s) 1240. Sensors 1240 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information as described in the embodiments herein.

Embodiments of the mobile device 1200 may also include a Global Navigation Satellite System (GNSS) receiver 1280 capable of receiving signals 1284 from one or more GNSS satellites using an antenna 1282 (which could be the same as antenna 1232). Positioning based on GNSS signal measurement can be utilized to complement and/or incorporate the techniques described herein. The GNSS receiver 1280 can extract a position of the mobile device 1200, using conventional techniques, from GNSS satellites 110 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1280 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1280 is illustrated in FIG. 12 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1210, DSP 1220, and/or a processing unit within the wireless communication interface 1230 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1210 or DSP 1220.

The mobile device 1200 may further include and/or be in communication with a memory 1260. The memory 1260 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1260 of the mobile device 1200 also can comprise software elements (not shown in FIG. 12), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1260 that are executable by the mobile device 1200 (and/or processing unit(s) 1210 or DSP 1220 within mobile device 1200). In an aspect, then such code and/or instructions can be used to configure and/or adapt a general-purpose computer (or other device) to perform one or more operations in accordance with the described methods.

FIG. 13 is a block diagram of an embodiment of a computer system 1300, which may be used, in whole or in part, to provide the functions of one or more network components as described in the embodiments herein (e.g., location server 160 of FIG. 1, LMF 220 of FIG. 2, an SLP, an E-SMLC, external client 180 or 230, and other servers as described herein, including server 805 of FIG. 8). It should be noted that FIG. 13 is meant only to provide a generalized illustration of various components, any or all of which may be utilized as appropriate. FIG. 13, therefore, broadly illustrates how individual system elements may be implemented in a relatively separated or relatively more integrated manner. In addition, it can be noted that components illustrated by FIG. 13 can be localized to a single device and/or distributed among various networked devices, which may be disposed at different geographical locations.

The computer system 1300 is shown comprising hardware elements that can be electrically coupled via a bus 1305 (or may otherwise be in communication, as appropriate). The hardware elements may include processing unit(s) 1310, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1300 also may comprise one or more input devices 1315, which may comprise without limitation a mouse, a keyboard, a camera, a microphone, and/or the like; and one or more output devices 1320, which may comprise without limitation a display device, a printer, and/or the like.

The computer system 1300 may further include (and/or be in communication with) one or more non-transitory storage devices 1325, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1300 may also include a communications subsystem 1330, which may comprise wireless communication technologies managed and controlled by a wireless communication interface 1333, as well as wired technologies (such as Ethernet, coaxial communications, universal serial bus (USB), and the like). The wireless communication interface 1333 may send and receive wireless signals 1355 (e.g., signals according to 5G NR or LTE) via wireless antenna(s) 1350. Thus the communications subsystem 1330 may comprise a modem, a network card (wireless or wired), an infrared communication device, a wireless communication device, and/or a chipset, and/or the like, which may enable the computer system 1300 to communicate on any or all of the communication networks described herein to any device on the respective network, including a UE, base stations and/or other TRPs, and/or any other electronic devices described herein. Hence, the communications subsystem 1330 may be used to receive and send data as described in the embodiments herein.

In many embodiments, the computer system 1300 will further comprise a working memory 1335, which may comprise a RAM or ROM device, as described above. Software elements, shown as being located within the working memory 1335, may comprise an operating system 1340, device drivers, executable libraries, and/or other code, such as one or more applications 1345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1325 described above. In some cases, the storage medium might be incorporated within a computer system, such as computer system 1300. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1300 and/or might take the form of source and/or installable code, which, upon compilation and/or installation on the computer system 1300 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method of determining a civic location of a mobile device performed by a location server, the method comprising:
receiving information regarding one or more Access Points (APs) from the mobile device, the information including an identity of each AP of the one or more APs;
determining a location of the mobile device based on the information and a coverage heatmap for each AP of the one or more APs, wherein the coverage heatmap for each AP of the one or more APs indicates:
a geographic area or geographic volume within which wireless signals from the respective AP can be received, and
a density of mobile device locations within the geographic area or geographic volume at which additional mobile devices received wireless signals from the respective AP; and
determining the civic location of the mobile device based on the location.

Clause 2: The method of clause 1, wherein the location comprises a geodetic location.

Clause 3: The method of clause 2, wherein the location comprises the geodetic location, and wherein determining the civic location based on the location comprises:
identifying a second location on a map or plan based on the location; and determining the civic location based on the second location on the map or plan.

Clause 4: The method of any of clauses 1-3, further comprising providing the civic location of the mobile device to the mobile device or an entity requesting the civic location of the mobile device.

Clause 5: The method of any of clauses 1-4, wherein the coverage heatmap for each AP of the one or more APs indicates the density of mobile device locations within the geographic area or geographic volume, wherein geographic area or geographic volume comprises one or more regions, and wherein the density of mobile device locations for each of one or more regions comprises:
a number of mobile device locations,
a number of mobile devices,
a fraction or portion of a total number of mobile device locations or total number of mobile devices within the geographic area or geographic volume, a probability that mobile devices within the geographic area or geographic volume are in the respective region, or a combination of these.

Clause 6: The method of any of clause 5, wherein each of the one or more regions comprises a respective sub-area, sub-volume, unit area, unit volume, pixel, or civic location within the geographic area or geographic volume.

Clause 7: The method of any of clauses 1-6, wherein determining the location of the mobile device based on the information and the coverage heatmap for each AP of the one or more APs comprises:

determining a plurality of candidate locations for the mobile device;

determining a probability of correspondence of each candidate location of the plurality of candidate locations to an actual location of the mobile device; and selecting, as the location, the candidate location of the plurality of candidate locations with a maximum probability of correspondence to the actual location of the mobile device.

Clause 8: The method of clause 7, wherein determining the probability of correspondence of each candidate location of the plurality of candidate locations to the actual location of the mobile device is based on the density of the mobile device locations for each respective AP of the one or more APs at each candidate location.

Clause 9: The method of clause 7, wherein:

the information includes first signal measurements for each AP of the one or more APs;

the coverage heatmap for each AP of the one or more APs includes statistics for second signal measurements obtained by the additional mobile devices at the mobile device locations within the geographic area or geographic volume; and determining the probability of correspondence of each candidate location of the plurality of candidate locations to the actual location of the mobile device is based on a correspondence of the first signal measurements to the second signal measurements for each candidate location.

Clause 10: The method of clause 9, wherein the first signal measurements and the second signal measurements include at least one of:

a received signal strength indication (RSSI), a round trip time (RTT), an angle of arrival (AOA), or a combination of these.

Clause 11: The method of clause 9 or 10, wherein the statistics for the second signal measurements comprise an average of the second signal measurements, a weighted average of the second signal measurements, a standard deviation of the second signal measurements, or a combination of these.

Clause 12: A method of determining a coverage heatmap for each of one or more Access Points (APs) performed by a location server, the method comprising:

receiving information regarding the one or more APs from each mobile device of a plurality of mobile devices, the information including, for each mobile device of the plurality of mobile devices:

an indication of one or more locations from a plurality of locations, and for each location of the one or more locations, an identity of at least one AP of the one or more APs whose wireless signals were received by each mobile device at each location; and for each AP of the one or more APs, determining the coverage heatmap for the respective AP from the information, wherein the coverage heatmap comprises a geographic area or geographic volume and a density of locations of the plurality of locations within the geographic area or geographic volume at which wireless signals from the respective AP were received by the plurality of mobile devices.

Clause 13: The method of clause 12, wherein:

the density of locations of the plurality of locations at which the wireless signals from the respective AP were received by the plurality of mobile devices is determined for each of one or more regions within the geographic area or geographic volume; and for each region, the density comprises:

a number of locations, a number of mobile devices, a fraction or portion of a total number of locations or total number of mobile devices within the geographic area or geographic volume, a probability that mobile devices within the geographic area or geographic volume are in the respective region, or a combination of these.

Clause 14: The method of clause 13, wherein each region comprises a respective sub-area, sub-volume, unit area, unit volume, pixel, or civic location.

Clause 15: The method of any of clauses 12-14, wherein the information includes signal measurements for the one or more APs, the signal measurements obtained by each mobile device of the plurality of mobile devices at each of the one or more locations from the plurality of locations, and further comprising:

determining the coverage heatmap for each AP of the one or more APs by determining statistics for the signal measurements for the respective AP at each location of the plurality of locations at which at least one mobile device of the plurality of mobile devices received wireless signals from the respective AP.

Clause 16: The method of clause 15, wherein the signal measurements include at least one of:

a received signal strength indication (RSSI);

a round trip time (RTT);

an angle of arrival (AOA); or a combination of these.

Clause 17: The method of clause 15 or 16, wherein the determining the statistics for the signal measurements for the respective AP comprises determining at least one of:

an average of the signal measurements, a weighted average of the signal measurements, a standard deviation of the signal measurements, or a combination of these.

Clause 18: A method of obtaining a civic location of a mobile device, performed by the mobile device, the method comprising:

detecting wireless signals from one or more Access Points (APs);

obtaining information regarding the one or more APs, the information including an identity of each AP of the one or more APs;

sending the information to a location server; and responsive to sending the information to the location sever, receiving the civic location of the mobile device from the location server, wherein the civic location is determined based on:

the information sent to the location server, and a coverage heatmap of at least one AP of the one or more APs.

Clause 19: The method of clause 18, further comprising:
obtaining first signal measurements for at least one AP of the one or more APs; and
including the first signal measurements in the information sent to the location server, wherein the civic location is further determined based on the first signal measurements.

Clause 20: The method of clause 19, wherein:
the coverage heatmap for the least one AP of the one or more APs includes statistics for second signal measurements obtained by additional mobile devices at a plurality of locations within a geographic area or geographic volume within which wireless signals from the least one AP of the one or more APs can be received; and
determining the civic location further comprises determining a probability that each candidate location in a plurality of candidate locations corresponds to an actual location of the mobile device, based on a correspondence of the first signal measurements to statistics for the second signal measurements for each candidate location.

Clause 21: The method of clause 20, wherein the statistics comprise an average, a weighted average, a standard deviation, or a combination of these.

Clause 22: The method of any of clauses 19-21, wherein the first signal measurements comprise:
a received signal strength indication (RSSI),
a round trip time (RTT),
an angle of arrival (AOA), or
a combination of these.

Clause 23: A server for determining a civic location of a mobile device, the server comprising:
a communication interface;
a memory; and
one or more processors communicatively coupled with the memory and the communication interface and configured to:
receive, via the communication interface, information regarding one or more Access Points (APs) from the mobile device, the information including an identity of each AP of the one or more APs;
determine a location of the mobile device based on the information and a coverage heatmap for each AP of the one or more APs, wherein the coverage heatmap for each AP of the one or more APs indicates:
a geographic area or geographic volume within which wireless signals from the respective AP can be received, and
a density of mobile device locations within the geographic area or geographic volume at which additional mobile devices received wireless signals from the respective AP; and
determine the civic location of the mobile device based on the location.

Clause 24: The server of clause 23, wherein the location comprises a geodetic location.

Clause 25: The server of clause 24, wherein the location comprises the geodetic location, and wherein, to determine the civic location based on the location, the one or more processors are configured to:
identify a second location on a map or plan based on the location; and
determine the civic location based on the second location on the map or plan.

Clause 26: The server of any of clauses 23-25, wherein the one or more processors are further configured to provide the civic location of the mobile device to the mobile device or an entity requesting the civic location of the mobile device.

Clause 27: The server of any of clauses 23-26, wherein the coverage heatmap for each AP of the one or more APs indicates the density of mobile device locations within the geographic area or geographic volume, wherein geographic area or geographic volume comprises one or more regions, and wherein the density of mobile device locations for each of one or more regions comprises:
a number of mobile device locations,
a number of mobile devices,
a fraction or portion of a total number of mobile device locations or total number of mobile devices within the geographic area or geographic volume,
a probability that mobile devices within the geographic area or geographic volume are in the respective region, or
a combination of these.

Clause 28: The server of clause 27, wherein each of the one or more regions comprises a respective sub-area, sub-volume, unit area, unit volume, pixel, or civic location within the geographic area or geographic volume.

Clause 29: The server of any of clauses 23-28, wherein, to determine the location of the mobile device based on the information and the coverage heatmap for each AP of the one or more AP, the one or more processors are configured to:
determine a plurality of candidate locations for the mobile device;
determine a probability of correspondence of each candidate location of the plurality of candidate locations to an actual location of the mobile device; and
select, as the location, the candidate location of the plurality of candidate locations with a maximum probability of correspondence to the actual location of the mobile device.

Clause 30: The server of clause 29, wherein the one or more processors are configured to determine the probability of correspondence of each candidate location of the plurality of candidate locations to the actual location of the mobile device based on the density of the mobile device locations for each respective AP of the one or more APs at each candidate location.

Clause 31: The server of clause 29, wherein:
the information includes first signal measurements for each AP of the one or more APs;
the coverage heatmap for each AP of the one or more APs includes statistics for second signal measurements obtained by the additional mobile devices at the mobile device locations within the geographic area or geographic volume; and
the one or more processors are configured to determine the probability of correspondence of each candidate location of the plurality of candidate locations to the actual location of the mobile device based on a correspondence of the first signal measurements to the second signal measurements for each candidate location.

Clause 32: The server of clause 31, wherein the first signal measurements and the second signal measurements include at least one of:
a received signal strength indication (RSSI),
a round trip time (RTT),
an angle of arrival (AOA), or a combination of these.

Clause 33: The server of clause 31 or 32, wherein the statistics for the second signal measurements comprise an average of the second signal measurements, a weighted average of the second signal measurements, a standard deviation of the second signal measurements, or a combination of these.

Clause 34: A server for determining a coverage heatmap for each of one or more Access Points (APs), the server comprising:
a communication interface;
a memory; and
one or more processors communicatively coupled with the memory and the communication interface and configured to:
receive, via the communication interface, information regarding the one or more APs from each mobile device of a plurality of mobile devices, the information including, for each mobile device of the plurality of mobile devices:
an indication of one or more locations from a plurality of locations, and
for each location of the one or more locations, an identity of at least one AP of the one or more APs whose wireless signals were received by each mobile device at each location; and
determine, for each AP of the one or more APs, the coverage heatmap for the respective AP from the information, wherein the coverage heatmap comprises a geographic area or geographic volume and a density of locations of the plurality of locations within the geographic area or geographic volume at which wireless signals from the respective AP were received by the plurality of mobile devices.

Clause 35: The server of clause 34, wherein the one or more processors are configured to determine the density of locations of the plurality of locations at which the wireless signals from the respective AP were received by the plurality of mobile devices for each of one or more regions within the geographic area or geographic volume, wherein, for each region, the density comprises:
a number of locations,
a number of mobile devices,
a fraction or portion of a total number of locations or total number of mobile devices within the geographic area or geographic volume,
a probability that mobile devices within the geographic area or geographic volume are in the respective region, or
a combination of these.

Clause 36: The server of clause 35, wherein each region comprises a respective sub-area, sub-volume, unit area, unit volume, pixel, or civic location.

Clause 37: The server of any of clauses 34-36, wherein the information includes signal measurements for the one or more APs, the signal measurements obtained by each mobile device of the plurality of mobile devices at each of the one or more locations from the plurality of locations, and wherein the one or more processors are further configured to:
determine the coverage heatmap for each AP of the one or more APs by determining statistics for the signal measurements for the respective AP at each location of the plurality of locations at which at least one mobile device of the plurality of mobile devices received wireless signals from the respective AP.

Clause 38: The server of clause 37, wherein the signal measurements include at least one of:
a received signal strength indication (RSSI);
a round trip time (RTT);
an angle of arrival (AOA); or
a combination of these.

Clause 39: The server of clause 37 or 38, wherein, to determine the statistics for the signal measurements for the respective AP, the one or more processors are configured to determine at least one of:
an average of the signal measurements,
a weighted average of the signal measurements,
a standard deviation of the signal measurements, or
a combination of these.

Clause 40: A mobile device comprising:
a communication interface;
a memory; and
one or more processors communicatively coupled with the memory and the communication interface and configured to:
detect, with the communication interface, wireless signals from one or more Access Points (APs);
obtain information regarding the one or more APs, the information including an identity of each AP of the one or more APs;
send, via the communication interface, the information to a location server; and
responsive to sending the information to the location sever, receive, via the communication interface, a civic location of the mobile device from the location server, wherein the civic location is determined based on:
the information sent to the location server, and
a coverage heatmap of at least one AP of the one or more APs.

Clause 41: The mobile device of clause 40, wherein the one or more processors are further configured to:
obtain first signal measurements for at least one AP of the one or more APs; and
include the first signal measurements in the information sent to the location server, wherein the civic location is further determined based on the first signal measurements.

Clause 42: The mobile device of clause 41, wherein:
the coverage heatmap for the least one AP of the one or more APs includes statistics for second signal measurements obtained by additional mobile devices at a plurality of locations within a geographic area or geographic volume within which wireless signals from the least one AP of the one or more APs can be received; and
to determine the civic location, the one or more processors are further configured to determine a probability that each candidate location in a plurality of candidate locations corresponds to an actual location of the mobile device, based on a correspondence of the first signal measurements to statistics for the second signal measurements for each candidate location.

Clause 43: The mobile device of clause 42, wherein the statistics comprise an average, a weighted average, a standard deviation, or a combination of these.

Clause 44: The mobile device of any of clauses 41-43, wherein the first signal measurements comprise:
a received signal strength indication (RSSI),
a round trip time (RTT),
an angle of arrival (AOA), or
a combination of these.

Clause 45: A device for determining a civic location of a mobile device, the device comprising:
- means for receiving information regarding one or more Access Points (APs) from the mobile device, the information including an identity of each AP of the one or more APs;
- means for determining a location of the mobile device based on the information and a coverage heatmap for each AP of the one or more APs, wherein the coverage heatmap for each AP of the one or more APs indicates:
  - a geographic area or geographic volume within which wireless signals from the respective AP can be received, and
  - a density of mobile device locations within the geographic area or geographic volume at which additional mobile devices received wireless signals from the respective AP; and
- means for determining the civic location of the mobile device based on the location.

Clause 46: The device of clause 45, wherein the location comprises a geodetic location.

Clause 47: The device of clause 46, wherein the location comprises the geodetic location, and wherein the means for determining the civic location based on the location comprises:
- means for identifying a second location on a map or plan based on the location; and
- means for determining the civic location based on the second location on the map or plan.

Clause 48: The device of any of clauses 45-47, further comprising means for providing the civic location of the mobile device to the mobile device or an entity requesting the civic location of the mobile device.

Clause 49: The device of any of clauses 45-48, wherein the coverage heatmap for each AP of the one or more APs indicates the density of mobile device locations within the geographic area or geographic volume, wherein geographic area or geographic volume comprises one or more regions, and wherein the density of mobile device locations for each of one or more regions comprises:
- a number of mobile device locations,
- a number of mobile devices,
- a fraction or portion of a total number of mobile device locations or total number of mobile devices within the geographic area or geographic volume,
- a probability that mobile devices within the geographic area or geographic volume are in the respective region, or
- a combination of these.

Clause 50: The device of clause 49, wherein each of the one or more regions comprises a respective sub-area, sub-volume, unit area, unit volume, pixel, or civic location within the geographic area or geographic volume.

Clause 51: The device of any of clauses 45-50, wherein the means for determining the location of the mobile device based on the information and the coverage heatmap for each AP of the one or more APs comprises:
- means for determining a plurality of candidate locations for the mobile device;
- means for determining a probability of correspondence of each candidate location of the plurality of candidate locations to an actual location of the mobile device; and
- means for selecting, as the location, the candidate location of the plurality of candidate locations with a maximum probability of correspondence to the actual location of the mobile device.

Clause 52: The device of clause 51, wherein the determining the probability of correspondence of each candidate location of the plurality of candidate locations to the actual location of the mobile device is based on the density of the mobile device locations for each respective AP of the one or more APs at each candidate location.

Clause 53: The device of clause 51, wherein:
- the information includes first signal measurements for each AP of the one or more APs;
- the coverage heatmap for each AP of the one or more APs includes statistics for second signal measurements obtained by the additional mobile devices at the mobile device locations within the geographic area or geographic volume; and
- determining the probability of correspondence of each candidate location of the plurality of candidate locations to the actual location of the mobile device is based on a correspondence of the first signal measurements to the second signal measurements for each candidate location.

Clause 54: The device of clause 53, wherein the first signal measurements and the second signal measurements include at least one of:
- a received signal strength indication (RSSI),
- a round trip time (RTT),
- an angle of arrival (AOA), or
- a combination of these.

Clause 55: The device of clause 53 or 54, wherein the statistics for the second signal measurements comprise an average of the second signal measurements, a weighted average of the second signal measurements, a standard deviation of the second signal measurements, or a combination of these.

Clause 56: A device for determining a coverage heatmap for each of one or more Access Points (APs), the device comprising:
- means for receiving information regarding the one or more APs from each mobile device of a plurality of mobile devices, the information including, for each mobile device of the plurality of mobile devices:
  - an indication of one or more locations from a plurality of locations, and
  - for each location of the one or more locations, an identity of at least one AP of the one or more APs whose wireless signals were received by each mobile device at each location; and
- means for determining, for each AP of the one or more APs, the coverage heatmap for the respective AP from the information, wherein the coverage heatmap comprises a geographic area or geographic volume and a density of locations of the plurality of locations within the geographic area or geographic volume at which wireless signals from the respective AP were received by the plurality of mobile devices.

Clause 57: The device of clause 56, wherein:
- the density of locations of the plurality of locations at which the wireless signals from the respective AP were received by the plurality of mobile devices is determined for each of one or more regions within the geographic area or geographic volume; and
- for each region, the density comprises:
  - a number of locations,
  - a number of mobile devices,
  - a fraction or portion of a total number of locations or total number of mobile devices within the geographic area or geographic volume, a probability that mobile devices within the geographic area or geographic volume are in the respective region, or a combination of these.

Clause 58: The device of clause 57, wherein each region comprises a respective sub-area, sub-volume, unit area, unit volume, pixel, or civic location.

Clause 59: The device of any of clauses 56-58, wherein the information includes signal measurements for the one or more APs, the signal measurements obtained by each mobile device of the plurality of mobile devices at each of the one or more locations from the plurality of locations, and the device further comprises:

means for determining the coverage heatmap for each AP of the one or more APs by determining statistics for the signal measurements for the respective AP at each location of the plurality of locations at which at least one mobile device of the plurality of mobile devices received wireless signals from the respective AP.

Clause 60: The device of clause 59, wherein the signal measurements include at least one of:

a received signal strength indication (RSSI);

a round trip time (RTT);

an angle of arrival (AOA); or a combination of these.

Clause 61: The device of clause 59 or 60, wherein the means for determining the statistics for the signal measurements for the respective AP comprises means for determining at least one of:

an average of the signal measurements, a weighted average of the signal measurements, a standard deviation of the signal measurements, or a combination of these.

Clause 62: A device for obtaining a civic location of a mobile device, the device comprising:

means for detecting wireless signals from one or more Access Points (APs);

means for obtaining information regarding the one or more APs, the information including an identity of each AP of the one or more APs;

means for sending the information to a location server; and means for receiving, responsive to sending the information to the location sever, the civic location of the mobile device from the location server, wherein the civic location is determined based on:

the information sent to the location server, and a coverage heatmap of at least one AP of the one or more APs.

Clause 63: The device of clause 62, further comprising:

means for obtaining first signal measurements for at least one AP of the one or more APs; and means for including the first signal measurements in the information sent to the location server, wherein the civic location is further determined based on the first signal measurements.

Clause 64: The device of clause 63, wherein:

the coverage heatmap for the least one AP of the one or more APs includes statistics for second signal measurements obtained by additional mobile devices at a plurality of locations within a geographic area or geographic volume within which wireless signals from the least one AP of the one or more APs can be received; and determining the civic location further comprises determining a probability that each candidate location in a plurality of candidate locations corresponds to an actual location of the mobile device, based on a correspondence of the first signal measurements to statistics for the second signal measurements for each candidate location.

Clause 65: The device of clause 64, wherein the statistics comprise an average, a weighted average, a standard deviation, or a combination of these.

Clause 66: The device of any of clauses 63-65, wherein the first signal measurements comprise:

a received signal strength indication (RSSI), a round trip time (RTT), an angle of arrival (AOA), or a combination of these.

Clause 67: A non-transitory computer-readable medium storing instructions for determining a civic location of a mobile device, the instructions comprising code for:

receiving information regarding one or more Access Points (APs) from the mobile device, the information including an identity of each AP of the one or more APs;

determining a location of the mobile device based on the information and a coverage heatmap for each AP of the one or more APs, wherein the coverage heatmap for each AP of the one or more APs indicates:

a geographic area or geographic volume within which wireless signals from the respective AP can be received, and a density of mobile device locations within the geographic area or geographic volume at which additional mobile devices received wireless signals from the respective AP; and determining the civic location of the mobile device based on the location.

Clause 68: The non-transitory computer-readable medium of clause 67, wherein the location comprises a geodetic location.

Clause 69: The non-transitory computer-readable medium of clause 68, wherein the location comprises the geodetic location, and wherein the code for determining the civic location based on the location comprises code for:

identifying a second location on a map or plan based on the location; and determining the civic location based on the second location on the map or plan.

Clause 70: The non-transitory computer-readable medium of any of clauses 67-69, further comprising code for providing the civic location of the mobile device to the mobile device or an entity requesting the civic location of the mobile device.

Clause 71: The non-transitory computer-readable medium of any of clauses 67-70, wherein the coverage heatmap for each AP of the one or more APs indicates the density of mobile device locations within the geographic area or geographic volume, wherein geographic area or geographic volume comprises one or more regions, and wherein the density of mobile device locations for each of one or more regions comprises:

a number of mobile device locations, a number of mobile devices, a fraction or portion of a total number of mobile device locations or total number of mobile devices within the geographic area or geographic volume, a probability that mobile devices within the geographic area or geographic volume are in the respective region, or a combination of these.

Clause 72: The non-transitory computer-readable medium of clause 71, wherein each of the one or more regions comprises a respective sub-area, sub-volume, unit area, unit volume, pixel, or civic location within the geographic area or geographic volume.

Clause 73: The non-transitory computer-readable medium of any of clauses 67-72, wherein the code for determining the location of the mobile device based on the information and the coverage heatmap for each AP of the one or more APs comprises code for:
 determining a plurality of candidate locations for the mobile device;
 determining a probability of correspondence of each candidate location of the plurality of candidate locations to an actual location of the mobile device; and
 selecting, as the location, the candidate location of the plurality of candidate locations with a maximum probability of correspondence to the actual location of the mobile device.

Clause 74: The non-transitory computer-readable medium of clause 73, wherein the determining the probability of correspondence of each candidate location of the plurality of candidate locations to the actual location of the mobile device is based on the density of the mobile device locations for each respective AP of the one or more APs at each candidate location.

Clause 75: The non-transitory computer-readable medium of clause 73, wherein:
 the information includes first signal measurements for each AP of the one or more APs;
 the coverage heatmap for each AP of the one or more APs includes statistics for second signal measurements obtained by the additional mobile devices at the mobile device locations within the geographic area or geographic volume; and
 determining the probability of correspondence of each candidate location of the plurality of candidate locations to the actual location of the mobile device is based on a correspondence of the first signal measurements to the second signal measurements for each candidate location.

Clause 76: The non-transitory computer-readable medium of clause 75, wherein the first signal measurements and the second signal measurements include at least one of:
 a received signal strength indication (RSSI),
 a round trip time (RTT),
 an angle of arrival (AOA), or
 a combination of these.

Clause 77: The non-transitory computer-readable medium of clause 75 or 76, wherein the statistics for the second signal measurements comprise an average of the second signal measurements, a weighted average of the second signal measurements, a standard deviation of the second signal measurements, or a combination of these.

Clause 78: A non-transitory computer-readable medium storing instructions for determining a coverage heatmap for each of one or more Access Points (APs), the instructions comprising code for:
 receiving information regarding the one or more APs from each mobile device of a plurality of mobile devices, the information including, for each mobile device of the plurality of mobile devices:
  an indication of one or more locations from a plurality of locations, and
  for each location of the one or more locations, an identity of at least one AP of the one or more APs whose wireless signals were received by each mobile device at each location; and
 determining, for each AP of the one or more APs, the coverage heatmap for the respective AP from the information, wherein the coverage heatmap comprises a geographic area or geographic volume and a density of locations of the plurality of locations within the geographic area or geographic volume at which wireless signals from the respective AP were received by the plurality of mobile devices.

Clause 79: The non-transitory computer-readable medium of clause 78, wherein:
 the density of locations of the plurality of locations at which the wireless signals from the respective AP were received by the plurality of mobile devices is determined for each of one or more regions within the geographic area or geographic volume; and
 for each region, the density comprises:
  a number of locations,
  a number of mobile devices,
  a fraction or portion of a total number of locations or total number of mobile devices within the geographic area or geographic volume,
  a probability that mobile devices within the geographic area or geographic volume are in the respective region, or
  a combination of these.

Clause 80: The non-transitory computer-readable medium of clause 79, wherein each region comprises a respective sub-area, sub-volume, unit area, unit volume, pixel, or civic location.

Clause 81: The non-transitory computer-readable medium of any of clauses 78-80, wherein the information includes signal measurements for the one or more APs, the signal measurements obtained by each mobile device of the plurality of mobile devices at each of the one or more locations from the plurality of locations, and the instructions further comprise code for:
 determining the coverage heatmap for each AP of the one or more APs by determining statistics for the signal measurements for the respective AP at each location of the plurality of locations at which at least one mobile device of the plurality of mobile devices received wireless signals from the respective AP.

Clause 82: The non-transitory computer-readable medium of clause 81, wherein the signal measurements include at least one of:
 a received signal strength indication (RSSI);
 a round trip time (RTT);
 an angle of arrival (AOA); or
 a combination of these.

Clause 83: The non-transitory computer-readable medium of clause 81 or 82, wherein the code for determining the statistics for the signal measurements for the respective AP comprises code for determining at least one of:
 an average of the signal measurements,
 a weighted average of the signal measurements,
 a standard deviation of the signal measurements, or
 a combination of these.

Clause 84: A non-transitory computer-readable medium storing instructions for obtaining a civic location of a mobile device, the instructions comprising code for:
 detecting wireless signals from one or more Access Points (APs);

obtaining information regarding the one or more APs, the information including an identity of each AP of the one or more APs;

sending the information to a location server; and receiving, responsive to sending the information to the location sever, the civic location of the mobile device from the location server, wherein the civic location is determined based on:

the information sent to the location server, and a coverage heatmap of at least one AP of the one or more APs.

Clause 85: The non-transitory computer-readable medium of clause 84, further comprising code for:

obtaining first signal measurements for at least one AP of the one or more APs; and including the first signal measurements in the information sent to the location server, wherein the civic location is further determined based on the first signal measurements.

Clause 86: The non-transitory computer-readable medium of clause 85, wherein:

the coverage heatmap for the least one AP of the one or more APs includes statistics for second signal measurements obtained by additional mobile devices at a plurality of locations within a geographic area or geographic volume within which wireless signals from the least one AP of the one or more APs can be received; and determining the civic location further comprises determining a probability that each candidate location in a plurality of candidate locations corresponds to an actual location of the mobile device, based on a correspondence of the first signal measurements to statistics for the second signal measurements for each candidate location.

Clause 87: The non-transitory computer-readable medium of clause 86, wherein the statistics comprise an average, a weighted average, a standard deviation, or a combination of these.

Clause 88: The non-transitory computer-readable medium of any of clauses 85-87, wherein the first signal measurements comprise:

a received signal strength indication (RSSI), a round trip time (RTT), an angle of arrival (AOA), or a combination of these.

What is claimed is:

1. A method of determining a civic location of a mobile device performed by a location server, the method comprising:

receiving information regarding one or more Access Points (APs) from the mobile device, the information including an identity of each AP of the one or more APs;

determining a location of the mobile device based on the information and a coverage heatmap for each AP of the one or more APs, wherein:

determining the location of the mobile device based on the information and the coverage heatmap for each AP of the one or more APs comprises:

determining a plurality of candidate locations for the mobile device;

determining a probability of correspondence of each candidate location of the plurality of candidate locations to an actual location of the mobile device; and selecting, as the location, a candidate location of the plurality of candidate locations with a maximum probability of correspondence to the actual location of the mobile device;

and wherein the coverage heatmap for each AP of the one or more APs indicates:

a geographic area or geographic volume within which wireless signals from a respective AP can be received, and a density of mobile device locations within the geographic area or geographic volume at which additional mobile devices received wireless signals from the respective AP, wherein reports from the additional mobile devices regarding reception of the wireless signals are received by the location server; and determining the civic location of the mobile device based on the location.

2. The method of claim 1, wherein the location comprises a geodetic location.

3. The method of claim 2, wherein the location comprises the geodetic location, and wherein determining the civic location based on the location comprises:

identifying a second location on a map or plan based on the location; and determining the civic location based on the second location on the map or plan.

4. The method of claim 1, further comprising providing the civic location of the mobile device to the mobile device or an entity requesting the civic location of the mobile device.

5. The method of claim 1, wherein the coverage heatmap for each AP of the one or more APs indicates the density of mobile device locations within the geographic area or geographic volume, wherein geographic area or geographic volume comprises one or more regions, and wherein the density of mobile device locations for each of one or more regions comprises:

a number of mobile device locations, a number of mobile devices, a fraction or portion of a total number of mobile device locations or total number of mobile devices within the geographic area or geographic volume, a probability that mobile devices within the geographic area or geographic volume are in the respective region, or a combination of these.

6. The method of claim 5, wherein each of the one or more regions comprises a respective sub-area, sub-volume, unit area, unit volume, pixel, or civic location within the geographic area or geographic volume.

7. The method of claim 1, wherein determining the probability of correspondence of each candidate location of the plurality of candidate locations to the actual location of the mobile device is based on the density of the mobile device locations for each respective AP of the one or more APs at each candidate location.

8. The method of claim 1, wherein:

the information includes first signal measurements for each AP of the one or more APs;

the coverage heatmap for each AP of the one or more APs includes statistics for second signal measurements obtained by the additional mobile devices at the mobile device locations within the geographic area or geographic volume; and determining the probability of correspondence of each candidate location of the plurality of candidate locations to the actual location of the mobile device is based on a correspondence of the first signal measurements to the second signal measurements for each candidate location.

9. The method of claim 8, wherein the first signal measurements and the second signal measurements include at least one of:
   a received signal strength indication (RSSI),
   a round trip time (RTT),
   an angle of arrival (AOA), or
   a combination of these.

10. The method of claim 8, wherein the statistics for the second signal measurements comprise an average of the second signal measurements, a weighted average of the second signal measurements, a standard deviation of the second signal measurements, or a combination of these.

11. A method of obtaining a civic location of a mobile device, performed by the mobile device, the method comprising:
   detecting wireless signals from one or more Access Points (APs);
   obtaining information regarding the one or more APs, the information including an identity of each AP of the one or more APs and first signal measurements for at least one AP of the one or more APs;
   sending the information to a location server; and
   responsive to sending the information to the location sever, receiving the civic location of the mobile device from the location server, wherein the civic location is determined based on:
      the information sent to the location server, including the first signal measurements, and
      a coverage heatmap of the at least one AP of the one or more APs, wherein:
         the coverage heatmap for the at least one AP of the one or more APs includes statistics for second signal measurements obtained by additional mobile devices at a plurality of locations within a geographic area or geographic volume within which wireless signals from the at least one AP of the one or more APs can be received, and
         the civic location is determined further based on a determined probability that each candidate location in a plurality of candidate locations corresponds to an actual location of the mobile device, based on a correspondence of the first signal measurements to statistics for the second signal measurements for each candidate location.

12. The method of claim 11, wherein the statistics comprise an average, a weighted average, a standard deviation, or a combination of these.

13. The method of claim 11, wherein the first signal measurements comprise:
   a received signal strength indication (RSSI),
   a round trip time (RTT),
   an angle of arrival (AOA), or
   a combination of these.

14. A server for determining a civic location of a mobile device, the server comprising:
   a communication interface;
   a memory; and
   one or more processors communicatively coupled with the memory and the communication interface and configured to:
   receive, via the communication interface, information regarding one or more Access Points (APs) from the mobile device, the information including an identity of each AP of the one or more APs;
   determine a location of the mobile device based on the information and a coverage heatmap for each AP of the one or more APs, wherein:
      to determine the location of the mobile device based on the information and the coverage heatmap for each AP of the one or more APs, the one or more processors are configured to:
         determine a plurality of candidate locations for the mobile device;
         determine a probability of correspondence of each candidate location of the plurality of candidate locations to an actual location of the mobile device; and
         select, as the location, a candidate location of the plurality of candidate locations with a maximum probability of correspondence to the actual location of the mobile device;
      and wherein the coverage heatmap for each AP of the one or more APs indicates:
         a geographic area or geographic volume within which wireless signals from a respective AP can be received, and
         a density of mobile device locations within the geographic area or geographic volume at which additional mobile devices received wireless signals from the respective AP, wherein reports from the additional mobile devices regarding reception of the wireless signals are received by the location server; and
   determining the civic location of the mobile device based on the location.

15. The server of claim 14, wherein the location comprises a geodetic location.

16. The server of claim 15, wherein the location comprises the geodetic location, and wherein, to determine the civic location based on the location, the one or more processors are configured to:
   identify a second location on a map or plan based on the location; and
   determine the civic location based on the second location on the map or plan.

17. The server of claim 14, wherein the one or more processors are further configured to provide the civic location of the mobile device to the mobile device or an entity requesting the civic location of the mobile device.

18. The server of claim 14, wherein the coverage heatmap for each AP of the one or more APs indicates the density of mobile device locations within the geographic area or geographic volume, wherein geographic area or geographic volume comprises one or more regions, and wherein the density of mobile device locations for each of one or more regions comprises:
   a number of mobile device locations,
   a number of mobile devices,
   a fraction or portion of a total number of mobile device locations or total number of mobile devices within the geographic area or geographic volume,
   a probability that mobile devices within the geographic area or geographic volume are in the respective region, or
   a combination of these.

19. The server of claim 18, wherein each of the one or more regions comprises a respective sub-area, sub-volume, unit area, unit volume, pixel, or civic location within the geographic area or geographic volume.

20. The server of claim 14, wherein the one or more processors are configured to determine the probability of correspondence of each candidate location of the plurality of candidate locations to the actual location of the mobile device based on the density of the mobile device locations for each respective AP of the one or more APs at each candidate location.

21. The server of claim 14, wherein:
the information includes first signal measurements for each AP of the one or more APs;
the coverage heatmap for each AP of the one or more APs includes statistics for second signal measurements obtained by the additional mobile devices at the mobile device locations within the geographic area or geographic volume; and
the one or more processors are configured to determine the probability of correspondence of each candidate location of the plurality of candidate locations to the actual location of the mobile device based on a correspondence of the first signal measurements to the second signal measurements for each candidate location.

22. The server of claim 21, wherein the first signal measurements and the second signal measurements include at least one of:
a received signal strength indication (RSSI),
a round trip time (RTT),
an angle of arrival (AOA), or
a combination of these.

23. The server of claim 21, wherein the statistics for the second signal measurements comprise an average of the second signal measurements, a weighted average of the second signal measurements, a standard deviation of the second signal measurements, or a combination of these.

24. A mobile device comprising:
a communication interface;
a memory; and
one or more processors communicatively coupled with the memory and the communication interface and configured to:
detect, with the communication interface, wireless signals from one or more Access Points (APs);
obtain information regarding the one or more APs, the information including an identity of each AP of the one or more APs and first signal measurements for at least one AP of the one or more APs;
send, via the communication interface, the information to a location server; and
responsive to sending the information to the location sever, receive, via the communication interface, a civic location of the mobile device from the location server, wherein the civic location is determined based on:
the information sent to the location server, including the first signal measurements, and
a coverage heatmap of the at least one AP of the one or more APs, wherein:
the coverage heatmap for the at least one AP of the one or more APs includes statistics for second signal measurements obtained by additional mobile devices at a plurality of locations within a geographic area or geographic volume within which wireless signals from the at least one AP of the one or more APs can be received, and
the civic location is determined further based on a determined probability that each candidate location in a plurality of candidate locations corresponds to an actual location of the mobile device, based on a correspondence of the first signal measurements to statistics for the second signal measurements for each candidate location.

25. The mobile device of claim 24, wherein the statistics comprise an average, a weighted average, a standard deviation, or a combination of these.

26. The mobile device of claim 24, wherein the first signal measurements comprise:
a received signal strength indication (RSSI),
a round trip time (RTT),
an angle of arrival (AOA), or
a combination of these.

27. A device for determining a civic location of a mobile device, the method comprising:
means for receiving information regarding one or more Access Points (APs) from the mobile device, the information including an identity of each AP of the one or more APs;
means for determining a location of the mobile device based on the information and a coverage heatmap for each AP of the one or more APs, wherein:
means for determining the location of the mobile device based on the information and the coverage heatmap for each AP of the one or more APs comprises:
means for determining a plurality of candidate locations for the mobile device;
means for determining a probability of correspondence of each candidate location of the plurality of candidate locations to an actual location of the mobile device; and
means for selecting, as the location, a candidate location of the plurality of candidate locations with a maximum probability of correspondence to the actual location of the mobile device;
and wherein the coverage heatmap for each AP of the one or more APs indicates:
a geographic area or geographic volume within which wireless signals from a respective AP can be received, and
a density of mobile device locations within the geographic area or geographic volume at which additional mobile devices received wireless signals from the respective AP, wherein reports from the additional mobile devices regarding reception of the wireless signals are received by a location server; and
means for determining the civic location of the mobile device based on the location.

28. The device of claim 27, wherein the coverage heatmap for each AP of the one or more APs indicates the density of mobile device locations within the geographic area or geographic volume, wherein geographic area or geographic volume comprises one or more regions, and wherein the density of mobile device locations for each of one or more regions comprises:
a number of mobile device locations,
a number of mobile devices,
a fraction or portion of a total number of mobile device locations or total number of mobile devices within the geographic area or geographic volume,
a probability that mobile devices within the geographic area or geographic volume are in the respective region, or
a combination of these.

29. A device for obtaining a civic location of a mobile device, the device comprising:

means for detecting wireless signals from one or more Access Points (APs);

means for obtaining information regarding the one or more APs, the information including an identity of each AP of the one or more APs and first signal measurements for at least one AP of the one or more APs;

means for sending the information to a location server; and means for receiving, responsive to sending the information to the location sever, the civic location of the mobile device from the location server, wherein the civic location is determined based on:

the information sent to the location server, including the first signal measurements, and a coverage heatmap of the at least one AP of the one or more APs, wherein:

the coverage heatmap for the at least one AP of the one or more APs includes statistics for second signal measurements obtained by additional mobile devices at a plurality of locations within a geographic area or geographic volume within which wireless signals from the at least one AP of the one or more APs can be received, and the civic location is determined further based on a determined probability that each candidate location in a plurality of candidate locations corresponds to an actual location of the mobile device, based on a correspondence of the first signal measurements to statistics for the second signal measurements for each candidate location.

30. A non-transitory computer-readable medium storing instructions for determining a civic location of a mobile device, the instructions comprising code for:

receiving information regarding one or more Access Points (APs) from the mobile device, the information including an identity of each AP of the one or more APs;

determining a location of the mobile device based on the information and a coverage heatmap for each AP of the one or more APs, wherein:

determining the location of the mobile device based on the information and the coverage heatmap for each AP of the one or more APs comprises:

determining a plurality of candidate locations for the mobile device;

determining a probability of correspondence of each candidate location of the plurality of candidate locations to an actual location of the mobile device; and selecting, as the location, a candidate location of the plurality of candidate locations with a maximum probability of correspondence to the actual location of the mobile device;

and wherein the coverage heatmap for each AP of the one or more APs indicates:

a geographic area or geographic volume within which wireless signals from a respective AP can be received, and a density of mobile device locations within the geographic area or geographic volume at which additional mobile devices received wireless signals from the respective AP, wherein reports from the additional mobile devices regarding reception of the wireless signals are received by a server; and determining the civic location of the mobile device based on the location.

31. A non-transitory computer-readable medium storing instructions for obtaining a civic location of a mobile device, the instructions comprising code for:

detecting wireless signals from one or more Access Points (APs);

obtaining information regarding the one or more APs, the information including an identity of each AP of the one or more APs and first signal measurements for at least one AP of the one or more APs;

sending the information to a location server; and receiving, responsive to sending the information to the location sever, the civic location of the mobile device from the location server, wherein the civic location is determined based on:

the information sent to the location server, including the first signal measurements, and a coverage heatmap of the at least one AP of the one or more APs, wherein:

the coverage heatmap for the at least one AP of the one or more APs includes statistics for second signal measurements obtained by additional mobile devices at a plurality of locations within a geographic area or geographic volume within which wireless signals from the at least one AP of the one or more APs can be received, and the civic location is determined further based on a determined probability that each candidate location in a plurality of candidate locations corresponds to an actual location of the mobile device, based on a correspondence of the first signal measurements to statistics for the second signal measurements for each candidate location.

* * * * *